United States Patent

Oka

[11] Patent Number: 5,912,671
[45] Date of Patent: Jun. 15, 1999

[54] METHODS AND APPARATUS FOR SYNTHESIZING A THREE-DIMENSIONAL IMAGE SIGNAL AND PRODUCING A TWO-DIMENSIONAL VISUAL DISPLAY THEREFROM

[75] Inventor: Masaaki Oka, Kanagawa, Japan

[73] Assignee: Sony Corporation, Tokyo, Japan

[21] Appl. No.: 08/797,876

[22] Filed: Feb. 10, 1997

Related U.S. Application Data

[63] Continuation of application No. 08/226,843, Apr. 13, 1994, abandoned.

[30]   Foreign Application Priority Data

| Apr. 15, 1993 | [JP] | Japan | ................................. | 5-088485 |
| Apr. 15, 1993 | [JP] | Japan | ................................. | 5-088486 |
| Feb. 15, 1994 | [JP] | Japan | ................................. | 6-018228 |

[51] Int. Cl.⁶ .................................................. G06F 17/00
[52] U.S. Cl. ................................................................ 345/427
[58] Field of Search ............................. 395/126, 127, 395/128, 118, 129, 125

[56]                References Cited

U.S. PATENT DOCUMENTS

| 5,224,208 | 6/1993 | Miller, Jr. et al. ...................... 395/125 |
| 5,295,199 | 3/1994 | Shino ....................................... 395/125 |
| 5,317,678 | 5/1994 | Okawara et al. ........................ 395/126 |
| 5,325,470 | 6/1994 | Sumino et al. .......................... 395/125 |
| 5,333,245 | 7/1994 | Vecchione ............................... 395/130 |
| 5,363,476 | 11/1994 | Kurashige et al. ...................... 395/125 |
| 5,369,736 | 11/1994 | Kato et al. ............................... 395/125 |

Primary Examiner—Cliff N. Vo
Attorney, Agent, or Firm—Frommer Lawrence & Haug LLP; William S. Frommer; Dennis M. Smid

[57]                   ABSTRACT

A method and apparatus for formulating a picture and a household game playing apparatus are provided. Data necessary for formulating the picture are read from picture data of a three-dimensional object stored in a main memory, and coordinates of apex points of relatively small-sized polygons comprising the three-dimensional object are produced by a geometry processor for producing luminance data and color data for each apex point. Color data and coordinate data of boundary points between the apex points are produced by a raster processor. The raster processor uses the color data and coordinate data of the boundary points to produce color data and coordinate data of intermediate points between the boundary points.

14 Claims, 20 Drawing Sheets

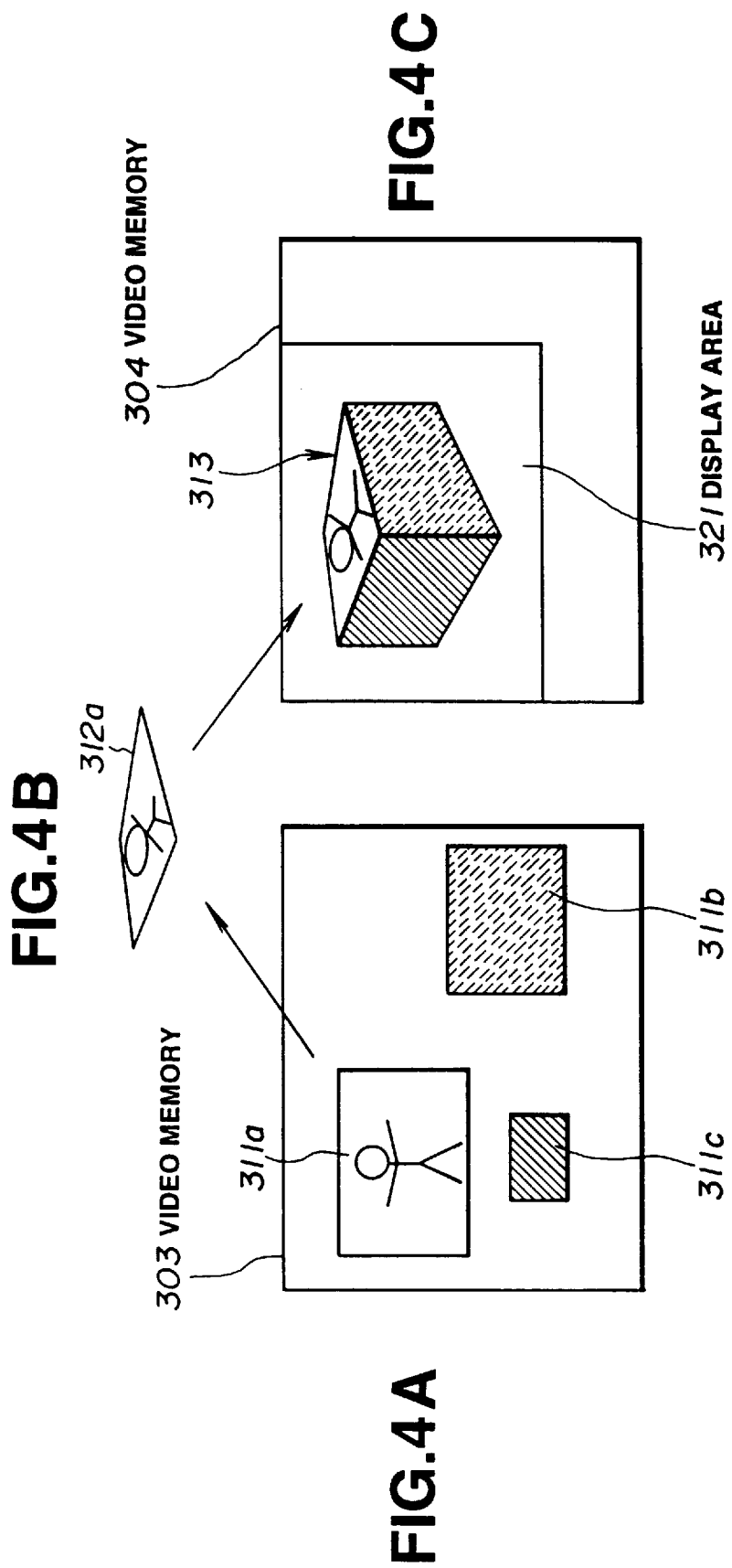

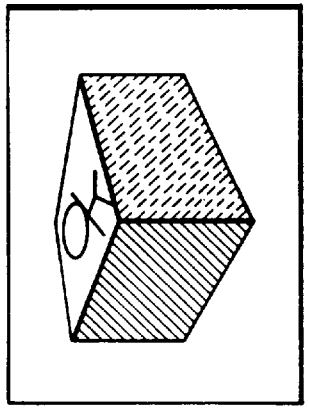
FIG.6B
3/4 CONVERSION TABLE
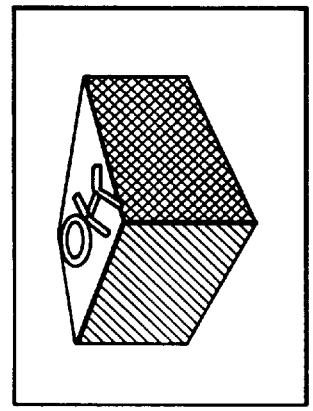
FIG.6C
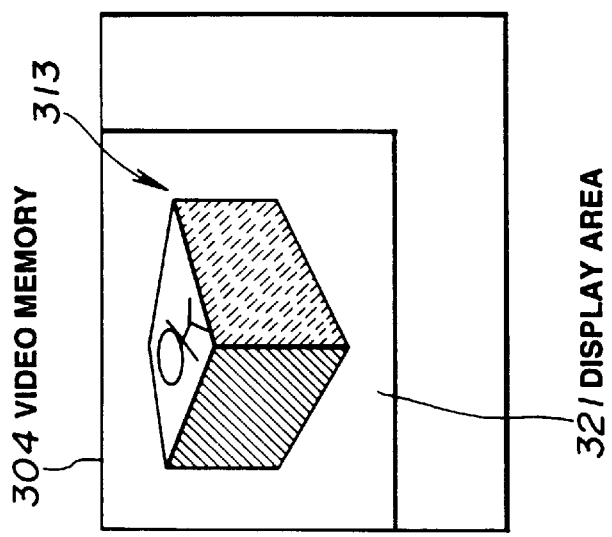
FIG.6A

METHODS AND APPARATUS FOR SYNTHESIZING A THREE-DIMENSIONAL IMAGE SIGNAL AND PRODUCING A TWO-DIMENSIONAL VISUAL DISPLAY THEREFROM

This application is a continuation of application Ser. No. 08/226,843, filed Apr. 13, 1994, now abandoned.

BACKGROUND OF THE INVENTION

The present invention relates to methods and apparatus for synthesizing three-dimensional picture signals and producing two-dimensional visual displays based on such signals.

In general, TV receivers, receiver monitors and CRT displays used in conjunction with household game playing apparatus, personal computers and graphic computing devices provide two-dimensional displays. The signals or data are produced so that two-dimensional characters and the like are suitably arrayed and moved on a planar background with or without changes in shape. However, in such display techniques the ability to change either the background or the character, as well as the movement thereof, are limited so that the ambience of the game or other display cannot be enhanced.

Methods have been adopted for formulating pseudo-three-dimensional images. In such techniques, plural pictures of a character to be displayed are stored, each picture depicting the character as viewed from a different direction. At a given time, one such picture is selected and displayed depending on the viewpoint adopted for the image being displayed. In another aspect of this technique, two-dimensional pictures are superposed along an image depth direction in order to display a pseudo-three-dimensional picture. In generating or formulating picture data, sometimes a texture mapping process is carried out whereby a surface texture or pattern, such as a ground pattern, is affixed to a selected face of a polyhedron forming an element of the image. A further technique employed involves converting picture color data by means of a so-called color pickup table in order to change the color of the displayed image.

FIG. 1 provides a block diagram of a proposed household game playing apparatus. In the apparatus of FIG. 1, a central processor (CPU) 91 comprising a micro-processor fetches operating information from an input device 94, such as an input pad or a joystick, via an interface 93 and a main bus 99. As the operating information is fetched by the CPU 91, three-dimensional picture data stored in a main memory 92 are transferred by a video processor 96 to a source video memory 95 for storage therein.

The CPU 91 also transmits data to the video processor 96 indicating the sequence in which pictures represented in memory 95 are to be displayed. The video processor 96 reads out picture data from the source video memory 95 in accordance with the data supplied by the CPU 91 in order to create a superposed picture display.

Simultaneously with the display of the picture, an audio processor 97 outputs voice data from an audio memory 98 which is based on voice information in the fetched operating information and which is coordinated with the picture that is being displayed. For example, if the picture being displayed depicts a car crashing, the audio processor 97 outputs an appropriate crashing sound.

FIG. 2 illustrates a sequence for producing and outputting a three-dimensional picture by the household game playing apparatus of FIG. 1, using two-dimensional picture data. The sequence depicted in FIG. 2 serves to produce a three-dimensional picture depicting a cylindrical object on checkerboard background pattern.

In FIG. 2, the source video memory 95 stores a background picture 200 in the form of a checkerboard pattern and a sequence of rectangular pictures 201 through 204 each representing a cross section of the cylindrical object to be overlaid on the checkerboard background pattern at varying depths. The portions of the rectangular pictures 201 through 204 other than the cross sections of the cylinder contain data representing transparency.

The picture data stored in the source video memory 95 is read-out in accordance with an address supplied from a read-out table 101 of the video processor 96. The CPU 91 provides read-out address control data to the table 101 over the main bus 99 for indicating which address is to be output from the table 101. In addition, a sync generator 100 produces read-out timing signals which it supplies to the read-out address table 101 and which are matched with synchronization signals for the picture to be displayed so that the read-out addresses are supplied by the table 101 in the appropriate order and at the appropriate times for displaying the desired picture.

The read-out picture data from the source video memory 95 are received by a superposition processor 103 which serves to superpose the picture data in the appropriate sequence in accordance with sequence data supplied from a priority table 102 under the control of signals supplied by the CPU 91 over the main bus 99. Each of the pictures 200 through 204 is assigned a sequential ranking beginning with a lowest rank for the background picture 200 and advancing to a highest ranking for the picture 204, so that the picture data as output by the superposition processor 103 represents a superposition of the pictures 200 through 204 in the appropriate order for displaying the cylindrical object on the checkerboard background.

The data output by the superposition processor 103 is supplied to a transparent color processor 104 wherein the data of each of the data pictures 201 through 204 representing transparency are processed so that underlying data may be displayed. Once the data has thus been processed by the transparent color processor 104, the data is output thereby as picture data representing a three-dimensional picture $VD_0$ as shown in FIG. 2.

FIG. 3 is a block diagram of a proposed picture formulating apparatus which carries out a texture mapping function. In FIG. 3, a central processing unit (CPU) 301 is depicted comprising a microprocessor or the like coupled with a main bus 309. A main memory 302 for storing programs and data, a video memory 303 for storing texture source picture data and a video memory 304 for storing display output data as formulated by the apparatus of FIG. 3, are coupled to the main bus 309. The CPU 301 reads out the texture source picture data from the video memory 303 with such modifications as are necessary in order to transform the texture data for mapping onto a display area of the video memory 303. The transformed texture data are written in the display area of the video memory 304 and later read therefrom and converted by a D/A converter 305 into analog signals which are output for displaying a picture.

FIGS. 4A through 4C depict a sequence of processing operations carried out by the picture formulating apparatus of FIG. 3. As shown in FIG. 4A, in the video memory 303 several texture source pictures provide original data to be transformed as described above for texture mapping, such a source texture pictures 311$a$, 311$b$ and 311$c$. The main memory 302 stores a program for controlling the CPU 301 for specifying the particular texture source picture to be used at a given time as well as a read-out position therefor to which the CPU 301 responds by reading out the appropriate picture data from the preset locations in the video memory 303 and carries out the above-mentioned modifications thereon as designated by the program to produce the modified picture 312a as illustrated in FIG. 4B. A modified picture 312a is then written in a display area 321 of the video memory 304. The write addresses for the display area 321 are also designated by the program stored in the main memory 302.

A sequence of such read out and modification operations as described above is carried out until the data of a complete picture 313 has been generated and stored in the display are 321 of the video memory 304. The picture data 313 is then read out from the video memory 304 in accordance with addresses determined as described above in synchronization with the video synchronization signals and converted to analog form by the D/A converter 305 to produce analog output picture signals.

FIG. 5 provides a block diagram of a picture formulating apparatus which carries out a picture data converting function whereby color data is output from a conversion table in the form of a color lookup table in response to image data. This provides the ability to change the color of the displayed image without re-writing image data. In the apparatus of FIG. 5, the CPU 301, main memory 302, video memories 303 and 304 coupled by means of the main bus 309, as well as a D/A converter 305, are similar to the corresponding devices of the FIG. 3 apparatus and are not, therefore, further described herein. In the arrangement of FIG. 5, a conversion table memory 306 is also provided storing a conversion table such as a lookup table for converting output display picture data read out from the video memory 304. The converted data are output from the conversion table memory 306 to the D/A converter 305 for conversion to analog form and are supplied thereby to a video or image output.

With reference also to FIGS. 6A through 6C, a sequence of operations carried out by the apparatus of FIG. 5 in processing and outputting a picture is illustrated therein. The. CPU 301 reads texture source data from the video memory 303 and modifies the same to store the modified data in appropriate locations of the video memory 304 to construct the picture 313 as depicted in FIG. 6A in accordance with the data conversion operations discussed above in connection with FIGS. 3 and 4. That is, the picture data 313 of FIG. 6A corresponds to the like-referenced picture as depicted in FIG. 4C. However the picture data 313 stored in the video memory 304 is provided in an intermediate or temporary form which cannot be output as is thereby to produce a picture display.

Rather, the picture data as store in the video memory 304 is read out from its display area 321, as represented by the illustration of FIG. 6B and used for addressing conversion table 314 in the conversion table memory 306 to output a color corresponding to each input address which, in turn, corresponds to a pixel of a picture to be output. The conversion table 314 serves to convert the address of virtual data supplied thereto from the video memory 304 into actual picture data, in accordance with a process represented schematically by FIG. 6C. The converted or actual picture data is output from the conversion table memory 306 to the D/A converter 305 for conversion thereby to analog picture data, as represented by FIG. 6D.

It will seen from the foregoing that the output picture data is not the same as that generated in the source video memory, but rather a three-dimensional picture is produced by changing read-out positions of the two-dimensional picture data stored in the source video memory and superposing the data of a number of pictures as read out. Consequently, the ability to express a three-dimensional picture generated in this manner is limited. For example, when processing a three-dimensional object picture for display by means of a household game playing apparatus on a screen, it may not be possible to correctly express the three-dimensional object picture in this way. It may occur that, since the point of view of the operator with respect to the object picture changes after the three-dimensional object picture has been processed, either the position of the object may not be changed correctly or the method of changing the three-dimensional picture may not be carried out in an appropriate manner. Likewise, the position of the viewing direction according to which the three-dimensional object is depicted is thus limited, for example, so that a back side of the object picture cannot be depicted even though the position or the direction of view of the three-dimensional object picture has been changed so that the same should be visible. It may also happen that the screen display to the operator occurs discontinuously even when three-dimensionally continuous movement is depicted.

Since multiple object pictures or picture data are stored in order to depict an object or other picture from various directions in order to represent a three-dimensional picture, the amount of data which must be stored for this purpose becomes voluminous. In addition, since the stored two-dimensional picture data are presented as three-dimensional picture data, substantial processing time is required for formulating each picture and game execution speed is consequently limited adversely.

In addition, since the two-dimensional picture data stored in the source video memory must be modified in order to produce a three-dimensional picture, the picture read-out control for the source video memory is complex and difficult to implement.

A further difficulty is posed, for example, in the case of the apparatus of FIG. 3 for which it is necessary to provide a video memory 303 which is dedicated to storage of the source texture data, which thus hinders efforts to achieve size reduction in the apparatus as well as to hold down production costs therefor. In the case of the apparatus of FIG. 5, it is necessary to provide a table memory 306 dedicated to storage of the conversion table as well as a CPU bus for accessing the table, which likewise hinders efforts to reduce the size of the apparatus as well as to minimize its production costs.

OBJECTS AND SUMMARY OF THE INVENTION

It is an object of the present invention to provide methods and apparatus for formulating picture data, as well as household game playing apparatus, which overcome or alleviate the foregoing shortcomings and limitations.

It is another object of the present invention to provide methods and apparatus for formulating three-dimensional picture data, and household game playing apparatus, wherein positions and orientations of an object as depicted thereby may be changed easily and quickly;

It is another object of the present invention to provide such methods and apparatus, as well as household game playing apparatus, which employ conversion tables and/or texture source data and whose size and costs of production are advantageously minimized.

In accordance with an aspect of the present invention, a method for formulating image signals for producing a three-dimensional picture display comprises the steps of: reading out first coordinate data for apex points of a plurality of polygonal picture areas as units of a desired three-dimensional picture stored in a first memory; producing second coordinate data representing coordinates of the apex points on a predetermined screen based on the first coordinate data; producing color data for each of said apex points; producing color data and coordinate data of boundary points between the apex points using the color data and the coordinate data of each of said apex points on the predetermined screen; producing color data and coordinate data of intermediate points between said boundary points using the color data and the coordinate data of said boundary points; and storing the produced color data and the coordinate data of the intermediate points in a second memory to form image signals for producing a three-dimensional picture display.

In accordance with another aspect of the present invention, an apparatus for formulating image signals representing a three-dimensional picture for displaying said three-dimensional picture with the use of said image signals, comprises: a first memory for storing first coordinate data of apex points of a plurality of polygonal areas as units of a desired three-dimensional picture; a geometry processor for converting the first coordinate data of the apex points of the polygonal areas stored in first memory to second coordinate data of a predetermined screen and for producing color data for each of said apex points; a raster processor for producing color data and coordinate data of boundary points between said apex points, based on the color data and the second coordinate data on the predetermined screen of the apex points as converted by said geometry processor, and for producing color data and coordinate data of intermediate points between said boundary points using the color data and coordinate data of the boundary points; and a second memory for storing the color data and the coordinate data of the intermediate points as produced by said raster processor, the color data of said intermediate points as stored representing said three-dimensional picture.

In certain embodiments, the coordinate data and color data of the apex points of the polygonal areas are store in the first memory.

In addition, in certain embodiments two-dimensional texture data is modified and mapped onto three-dimensional picture data to be displayed. In some embodiments, the coordinate data of the apex points of polygonal areas and texture coordinate data indicating coordinate positions of the two-dimensional texture data are stored in the first memory.

In certain embodiments of the invention, the end positions of horizontally extending line segments slicing a polygonal area at a predetermined distance from one of the apex points thereof are used as the boundary points and color data of the intermediate points are produced based on such boundary points by interpolation.

As used herein, the terms "color information" and "color data" include both color vectors for use in effecting a color display as well as luminance and gradation data for use in effecting a monochromatic display.

In accordance with a further aspect of the present invention, a household game playing apparatus is provided in which an object image for display as a three-dimensional picture is formulated, comprising: an external storage medium in which a game program and picture information employed in executing said game program are stored; operating means for processing the picture information of the game program stored in said external storage medium for producing display picture data representing movement of the object image; display means for displaying the display picture data; a first memory for storing first coordinate data of apex points of a plurality of polygonal areas in units of the object image included in said picture data; a geometry processor for converting the first coordinate data of the apex points of the polygonal areas stored in said first memory responsive to an input from said operating means for producing second coordinate data thereof on a predetermined screen and for producing color data for each of the apex points; a raster processor for producing color data and coordinate data of boundary points between said apex points, using the color data and coordinate data on said screen of said apex points as produced by said geometry processor, and for producing color data and coordinate data of intermediate points between said boundary points, using the color data and coordinate data of said boundary points; and a second memory for storing the color data and the coordinate data of the intermediate points as produced by said raster processor for producing three-dimensional picture data of the object image.

In certain embodiments, the external storage medium for the household game playing machine is either a CD-ROM or a memory card. In some embodiments, moreover, the game playing apparatus includes non-volatile storage means for storing the state of progress of the game on termination of a game program.

In certain embodiments, data for the output picture to be displayed by the display means is formulated with the use of data written in a portion of a picture memory other than a portion thereof in which the output picture data is stored. In certain embodiments, the output picture data is formulated with the use of a conversion table and/or texture source data, and the memory locations in which the output picture data are stored in the picture memory are switched.

In accordance with yet another aspect of the present invention a method for formulating picture data is provided, comprising the steps of: storing source data for formulating output picture data in a first region of a picture memory; processing the stored source data for producing the output picture data; and storing the output picture data in a second region of the picture memory other than the first region thereof.

In accordance with a still further aspect of the present invention, a picture formulating apparatus for formulating data of an output picture for output to a picture display device for displaying the output picture, comprises: a picture memory for storing the data of said output picture in a first storage area thereof and a processor for storing source data for formulating the output picture data in an area of said picture memory other than the first storage area for said output picture data and for producing the output picture data based on the source data.

In accordance with a still further aspect of the present invention, a household game playing apparatus for formulating data of an output picture to be output for display by a picture display device, comprises: a picture memory for storing data of said output picture in a first storage area thereof; and a processor for storing source data for formulating the output picture data in an area of said picture memory other than the first storage area for said output picture data and for producing the output picture data based on the source data.

According to certain features of the present invention, coordinate data of the apex points of polygonal areas stored in a first memory are converted for producing color data and further coordinate data on a predetermined screen, color data and coordinate data on the screen of boundary points between the apex points are produced using the color data and the coordinate data of the apex points on the screen, color data and coordinate data on the screen of intermediate points between the boundary points are produced using the color data and the coordinate data of the boundary points on the screen, and the color data of the intermediate points are written in a second memory for producing output data for use in displaying a three-dimensional picture.

In accordance with certain other features of the present invention, a method is employed using two-dimensional picture data, such as texture data, by slicing a polygonal area at a predetermined distance from one of the apex points thereof by means of a line segment having boundary points at either end, and producing color data of intermediate points of the line segment by interpolation and mapping the resulting color data of the intermediate points on three-dimensional picture data.

In certain embodiments of the household game playing apparatus of the present invention, a game program stored in the external storage medium (such as a CD-ROM or a memory card) is input to the apparatus, the game program including three-dimensional picture data for use in formulating a picture to be displayed.

Since color data and coordinate data of apex points of polygonal areas are stored in memory for formulating boundary point data and intermediate point data, a three-dimensional object picture may be represented correctly. Also, since two-dimensional texture data is modified and mapped on a three-dimensional picture for display, and since texture coordinate data indicating coordinate points of the two-dimensional picture are employed in such mapping operation, the three-dimensional object may be represented with the use of such texture data correctly.

In those embodiments where a horizontally extending line segment is used to slice a polygonal area at a predetermined distance from one of the apex points thereof to defined boundary points and to derive color data for intermediate points along the segment by interpolation, a three-dimensional object picture may be formulated easily.

In the case of the household game playing apparatus of the present invention, in producing the display picture data representing movement of the object image, its position and orientation can be changed correctly and accurately by the operating means, and there is no limitation imposed on the direction and orientation of the object image as represented, so that, even if the picture from the viewpoint of the operator is changed continuously three-dimensionally, a picture may be displayed which is responsive to the continuous three-dimensional changes correctly and accurately.

Moreover, since the data volume of the picture data necessary for representing the three-dimensional picture represents polygonal areas simply by their apex points, so that the game formulating time may be diminished, it becomes possible to improve game productivity and speed of execution of a computer formulated game. In addition, in those embodiments where three-dimensional picture data is formulated horizontal line by horizontal line as the same as written in the video memory, so that the three-dimensional picture data thus written in the memory can be read during the usual scanning of video signals, the process of reading the picture data is made easy.

In those embodiments which employ an external storage medium such as a CD-ROM or memory card, a voluminous game program can be stored therein and read therefrom quickly.

In those embodiments which employ a non-volatile memory means in a game playing apparatus for storing game status data, the progress of a computer game up to the end of program execution can be recorded, so that the game can be re-started beginning from the point at which the program was terminated.

By using portions of the picture memory other than those in which output display picture data are stored for storing picture data for use in formulating such output picture data, a three-dimensional picture may be produced correctly and accurately by means of an apparatus having an advantageously small size and low cost. In those embodiments in which a conversion table for a texture source picture data or other picture data is used for producing a display output picture, a three-dimensional object picture may be represented accurately and correctly.

In those embodiments in which the addresses at which the output picture data is store are changed, it is possible to save and employ previously generated picture data to produce a new display output picture. In this manner, the new output picture can be represented correctly and accurately.

The above and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

BRIEF DESCRIPTION OF THE DRAWINGS

FIGS. 4A through 4C illustrate a sequence of operations carried out by the apparatus of FIG. 3;

FIGS. 6A through 6C illustrates a sequence of operations carried out by the apparatus of FIG. 5;

DETAILED DESCRIPTION OF CERTAIN ADVANTAGEOUS EMBODIMENTS

Figure 7:
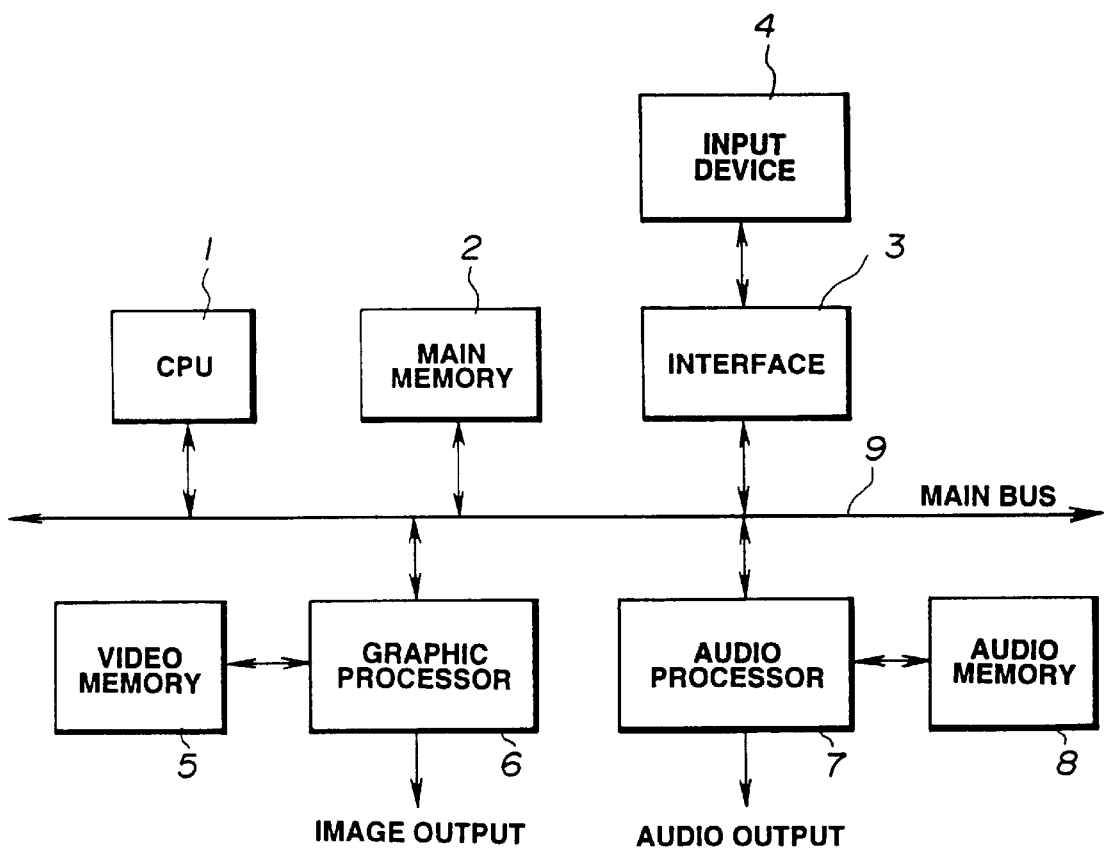
FIG. 7 is a block diagram of a picture formulating apparatus in accordance with an embodiment of the present invention.

With reference now to the drawings, and in particular to the embodiment of FIG. 7, a central processing unit (CPU 1), such as a microprocessor, serves to fetch operating information from an input device 4, such as an input pad or a joystick,.via an interface 3 and a main bus 9. Based on the operating information fetched from the device 4, the CPU 1 transmits a three-dimensional picture stored in a main memory 2 to a graphic processor 6 over the main bus 9. The graphic processor 6 serves to convert the data from the main memory 2 into picture data. A three-dimensional picture thus generated by the graphic processor 6 is stored in a video memory 5. The picture data stored in the memory 5 is read out in accordance with scanning by video signals for displaying a three-dimensional picture on a display device, not shown for purposes of simplicity and clarity.

At the same time that the three-dimensional picture is being displayed as described above, voice data which has been fetched by the CPU 1 from the main memory 2 and which is associated with the displayed three-dimensional picture is routed to an audio processor 7. Based on the received voice information, the audio processor 7 outputs appropriate voice data stored in an audio memory 8.

A shading method for displaying a three-dimensional picture by shading an object is explained as a first embodiment of the present invention, while a texture mapping method also for displaying a three-dimensional picture, but by modification and mapping of further two-dimensional picture data will also be explained as a second embodiment of the present invention.

Following are three-dimensional coordinate systems which will be employed in describing various features of the disclosed embodiments. An object coordinate system serves to represent the shape and size of a three-dimensional object itself. A world coordinate system represents the position of a three-dimensional object in a three-dimensional space. Finally, a screen coordinate system represent a three-dimensional object displayed on a two-dimensional screen. In order to simplify the explanation of the disclosed embodiments, the object coordinate system and the screen coordinate system are principally used. In addition, while a three-dimensional object may be represented according to the present invention by means of a plurality of polygonal areas, processing of data representing triangular areas will be described hereinbelow for purposes of simplicity and clarity.

The shading method according to the first embodiment as mentioned above, will now be explained in connection with FIG. 8.

Figure 8:
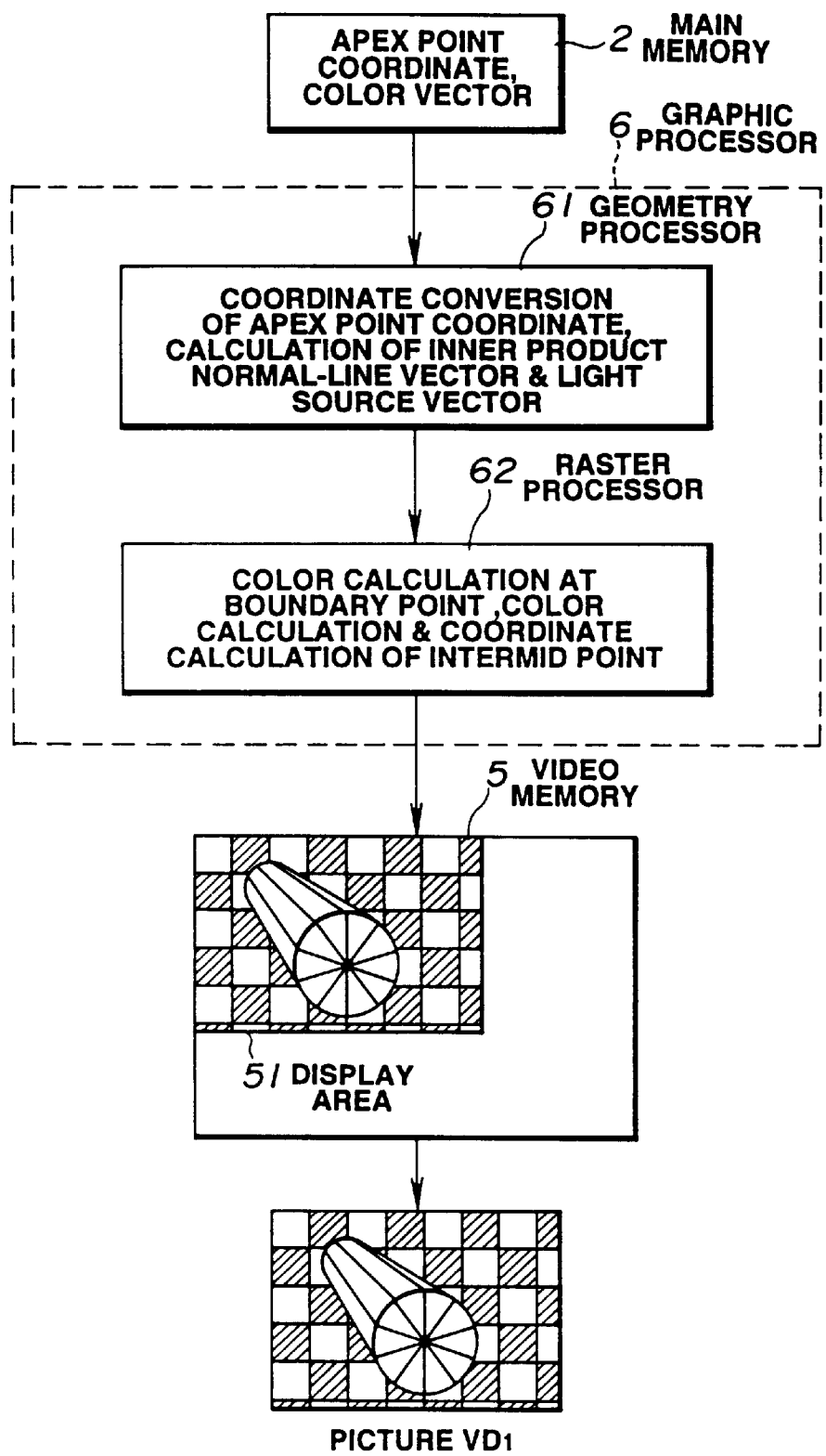
FIG. 8 is a functional block diagram for use in explaining processing according to a first embodiment of a picture formulating method according to the present invention.

In the main memory 2 of the FIG. 7 apparatus, as depicted in FIG. 8, picture information, such as color vectors and coordinates of the apex points of a triangle used for formulating a picture of a three-dimensional object are stored. For the purpose of formulating such a picture, the picture information stored in the memory 2 is read by the CPU 1 for supply to a geometry processor 61 of the graphic processor 6 as illustrated in FIG. 8.

In general, in the graphic processor 61 the coordinates of the apex points are converted to screen coordinates with the aid of read-out picture information, namely, a coordinate transformation matrix. That is, the coordinate transformation matrix is applied to the apex point coordinates and the X and Y coordinates thus obtained are divided by the Z coordinate thus obtained. In addition, color and luminance data for the apex points as displayed on the screen are calculated by obtaining the inner product of a normal line vector (a vector normal to the triangular area represented by the apex points) and a light source vector produced by light source data supplied by the CPU 1 which reads the same from the main memory 2. The result of the inner product multiplies color data specific to the apex point as described in greater detail below, for producing the color and luminance data thereof.

The values of the color and luminance data of the apex points on the screen as thus obtained are routed to a raster processor 62 of the graphic processor 6, as depicted in FIG. 8, which produces output picture data for intermediate points of the triangle delimited by the three apex points, by an interpolation process using the coordinate values as well as the color and luminance data of the apex points. In this manner, a picture $VD_1$ of the three-dimensional object is obtained having pixels whose coordinate values represent position within a screen coordinate system which is stored in a display area 51 of the video memory 5 and output therefrom under the control of the graphic processor 6.

As depicted in FIG. 8, the main memory 2 stores picture information such as coordinates of the apex points of a triangular area necessary for formulating a picture of a three-dimensional object. In addition, the main memory 2 stores texture coordinates indicating coordinate positions of texture data for mapping to another picture. In the texture mapping method in accordance with the second embodiment of the present invention, the picture information is read by the CPU 1 of FIG. 7 from the main memory 2 thereof for routing to the geometry processor 61 of the graphic processor 6.

Figure 9:
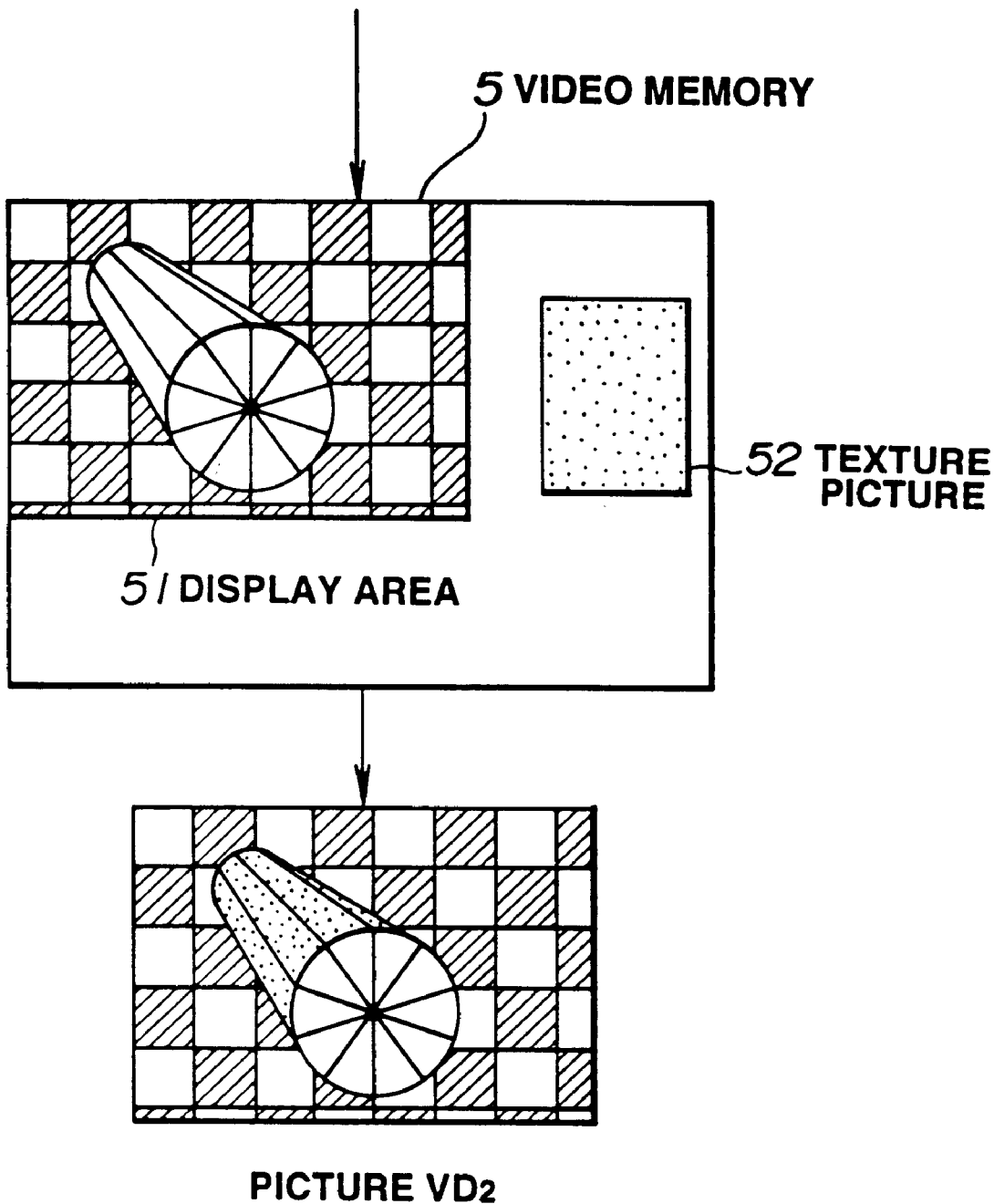
FIG. 9 is a functional block diagram for use in illustrating processing in accordance with a second embodiment of a picture formulating method of the present invention.

In the geometry processor 61 the coordinates of the apex points are converted with the aid of the read-out picture information for calculating the coordinates of the apex points on the screen. Color and luminance data of the apex points on the screen are obtained by determining the inner product of the normal line vector to the triangular area and a light source vector produced from the light source data and the inner product thus produced multiplies color data specific to the apex point. The values of the color and luminance data of the apex points thus obtained are routed to the raster processor 62. The raster processor 62 also determines, by an interpolation process, luminance data for intermediate points in a triangular area delimited by three apex points in a texture area such that each apex point in the texture area corresponds to an apex point of the object area. The texture area is provided as an off screen area of the video memory 5 containing texture data to be mapped on the object. In this manner, a picture $VD_2$ as illustrated in FIG. 9, is formulated by mapping texture picture data on the various polygons of the object by accessing the luminance data from the texture picture 52 of FIG. 9 by means of appropriately produced coordinate values for matching the luminance data to pixels in the display area 51 of the video memory 5. Once the picture data has been thus formulated and stored in the display area 51, it is then output under the control of the graphic processor 6.

Figure 10:
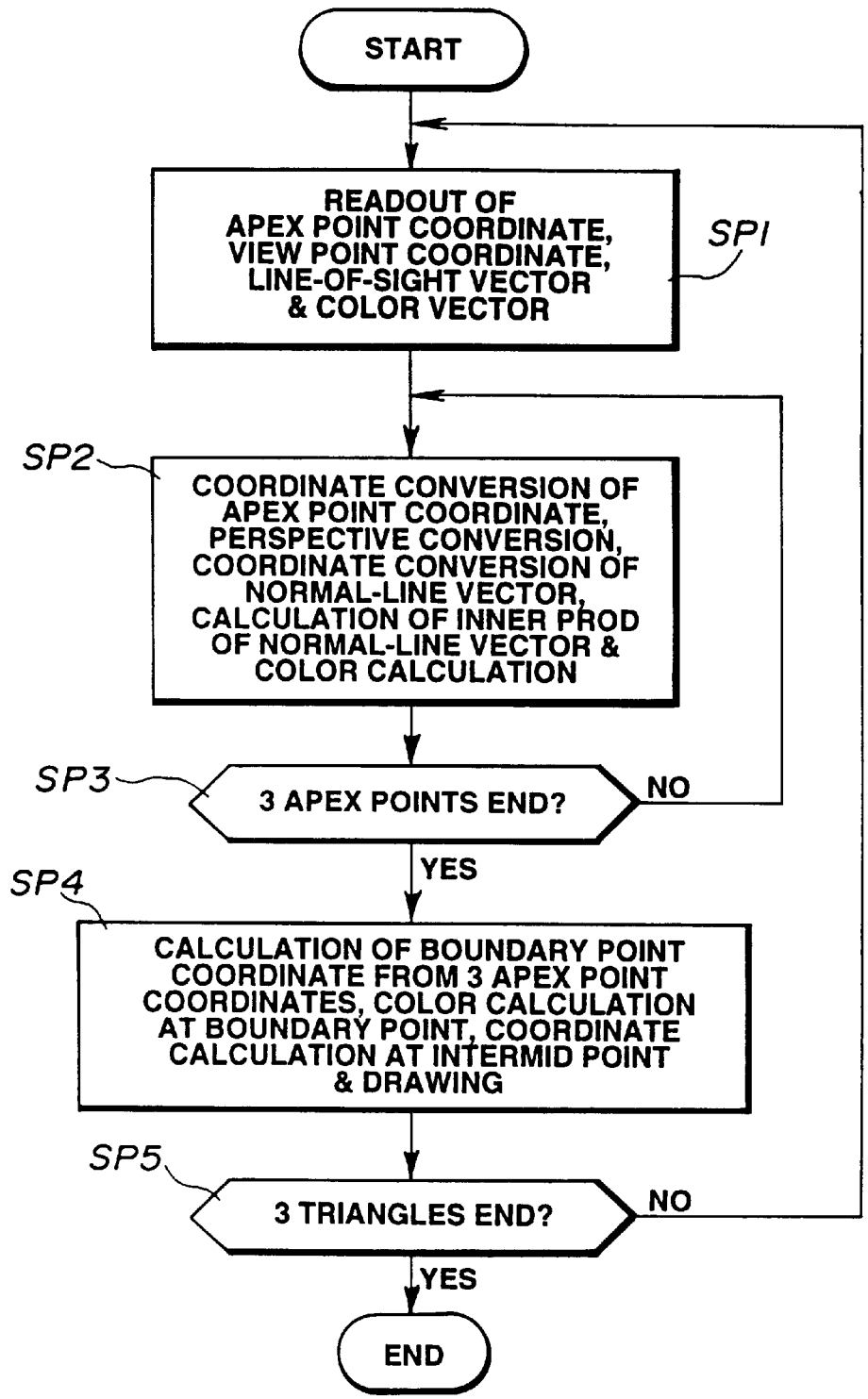
FIG. 10 is a flow chart for illustrating processing in accordance with the first embodiment of the picture formulating methods.

A sequence of operations carried out by the apparatus of FIG. 7 for producing and displaying a three-dimensional picture in accordance with the shading method of the first embodiment is illustrated in the flow chart of FIG. 10.

Figure 1:
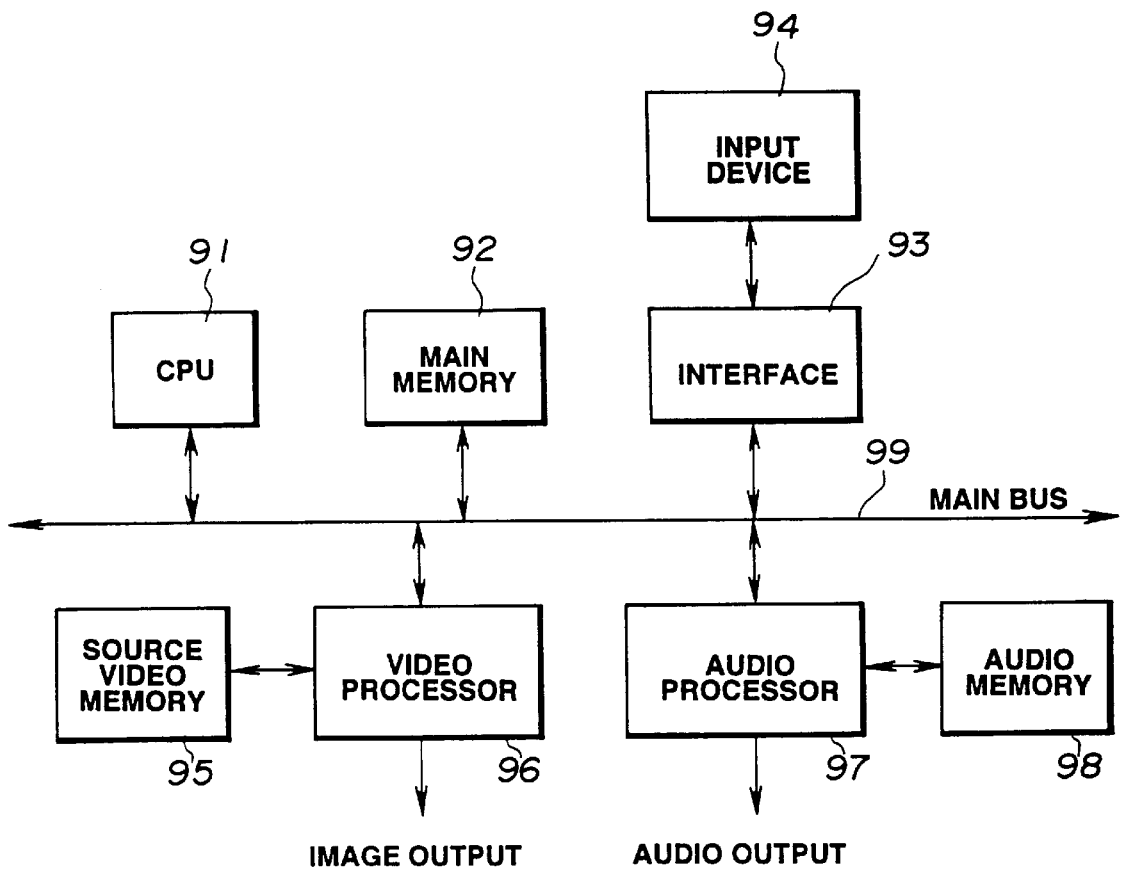
FIG. 1 is a block diagram of a proposed picture formulating apparatus.
Figure 2:
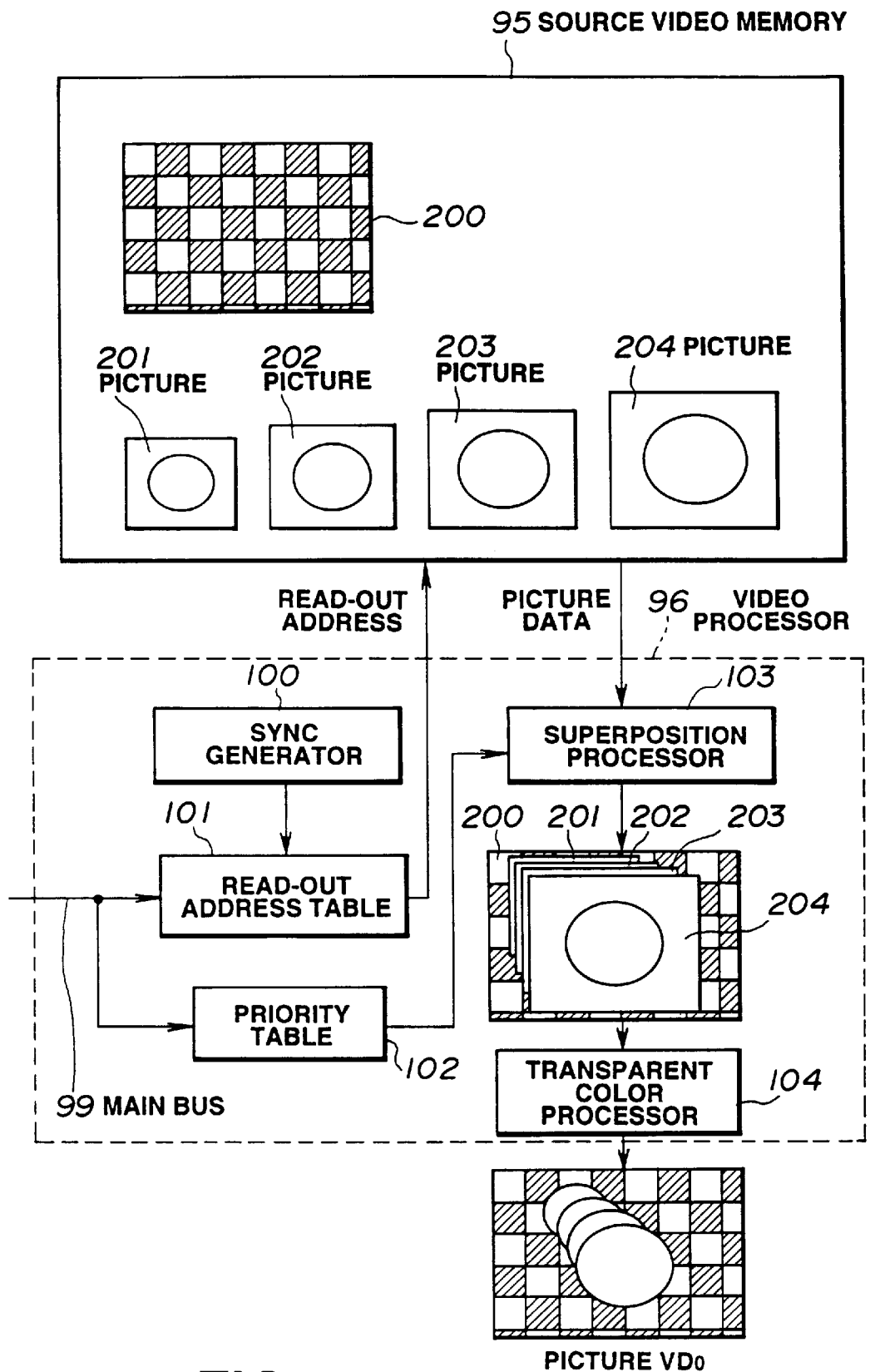
FIG. 2 illustrates a sequence of operations carried out by the apparatus of FIG. 1.

In a step SP1 of FIG. 10, information necessary for formulating the picture is accessed from a variety of picture information data stored in the main memory 2 of FIG. 8, such as coordinates V of the apex points of a small-size triangle represented in an object coordinate system, a coordinate conversion matrix R for converting the apex point coordinates from the object coordinate system into a world coordinate system, a parallel translation vector T for transforming the apex point coordinates in order to represent translational movement of the object, a line-of-sight vector which serves to translate and rotate the entire three-dimensional image to present the image according to the position of the viewer and the direction in which the viewer is looking for representing the apex point coordinates according to the screen coordinate system, as well as a normal-line vector N and a color vector C. The foregoing data, as required, are read in sequence by the CPU 1 of FIG. 1 and routed to the graphic processor 6.

Figure 11A:
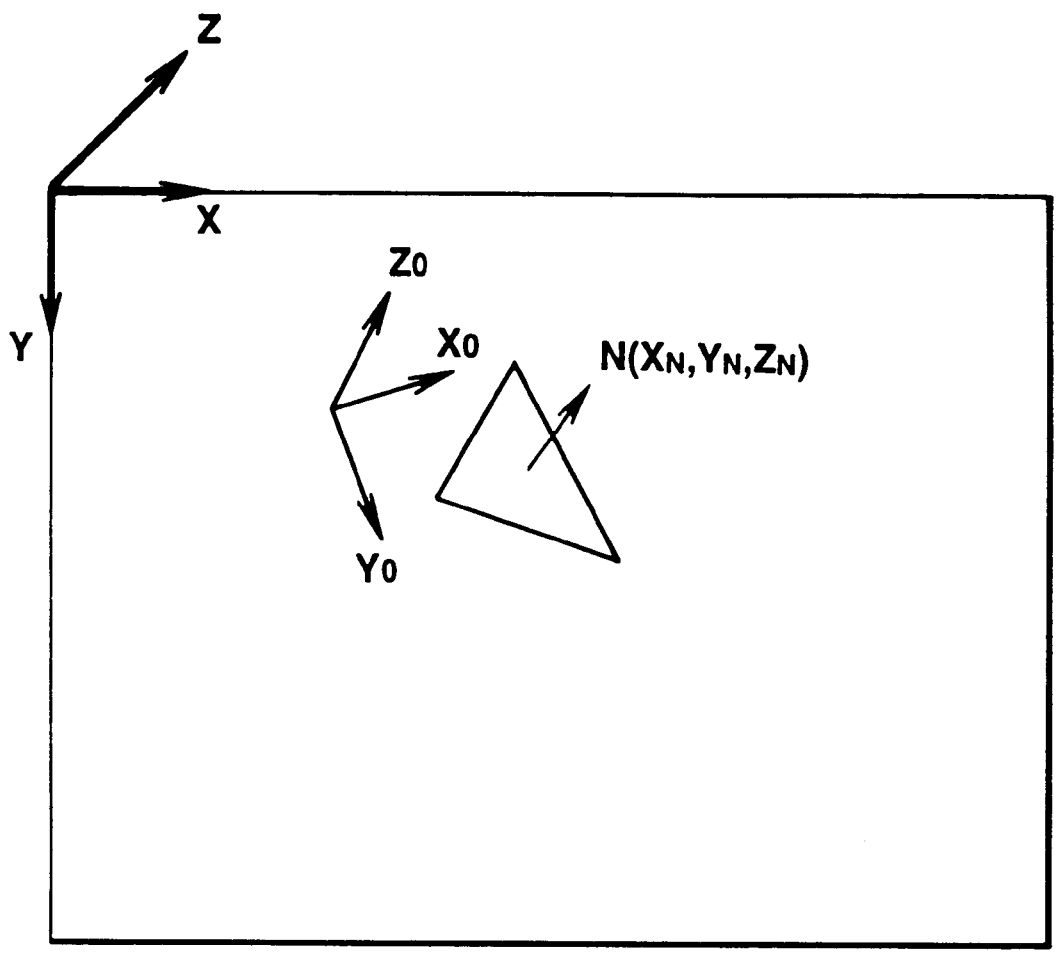
FIG. 11A illustrates a process of converting a normal line vector in an object coordinate system to a normal line vector in a screen coordinate system.
Figure 11B:
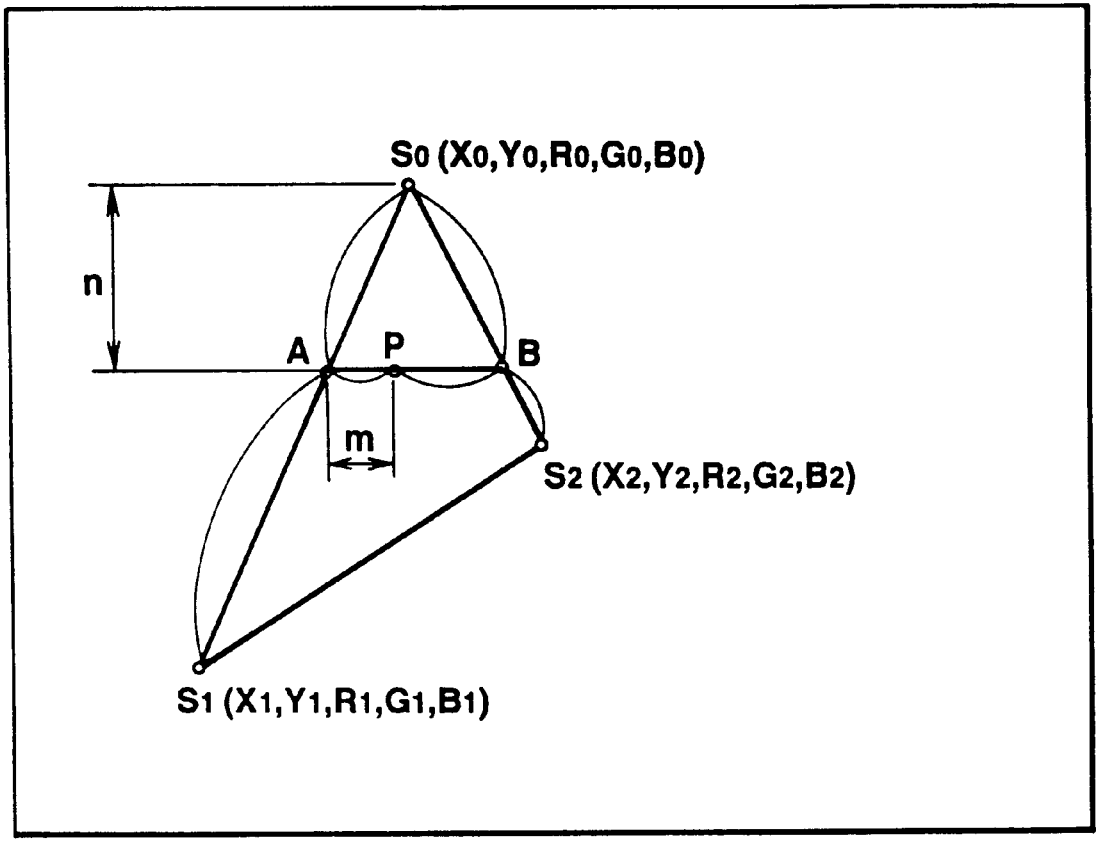
FIG. 11B illustrates coordinate values and drawing colors of a triangle as produced in accordance with the first embodiment of a picture formulating method.

In a step SP2 of FIG. 10, the coordinate values of the apex points of the triangle and drawing colors therefor are produced using the data read out as described above. First, in the geometry processor 61 (FIG. 8) the three-dimensional coordinates of each apex point are converted by means of the coordinate conversion matrix R (for rotating the triangular area) and the parallel translation vector T (for translating the same) to produce corresponding three-dimensional coordinate vectors V in accordance with the following formula (1):

$$(X_S, Y_S, Z_S) = (X_V, Y_V, Z_V) \times R + (X_T, Y_T, Z_T) \tag{1}$$

wherein $(X_S, Y_S, Z_S)$ represents coordinates of the apex points $S_0$, $S_2$, and $S_1$ as illustrated in FIG. 11B, $(X_V, Y_V, Z_V)$ represent the coordinate vectors of the apex points in the object coordinate system, R is the coordinate conversion matrix for rotating the area, and $(X_T, Y_T, Z_T)$ is the parallel translation vector.

The coordinates $X_S$ and $Y_S$ are then subjected to perspective conversion in accordance with the following formulas (2) and (3):

$$X = X_S \times (h/Z_S) \tag{2}$$

$$Y = Y_S \times (h/Z_S) \tag{3}$$

wherein h represents the distance from the viewpoint of the operator to the display screen and $Z_S$ represents the depth of the apex point from the screen after conversion in accordance with formula (1). The perspective conversion serves to modify the size of the object depending on the distance from the position of the operator in order to produce a scenographic or perspective sense or feeling.

The normal-line vector N relative to the plane of the triangle is converted, with the use of the coordinate converting matrix R, into a normal line vector P in the screen coordinate system in accordance with the following formula (4):

$$(X_P, Y_P, Z_P) = (X_N, Y_N, Z_N) \times R \tag{4}$$

wherein $(X_N, Y_N, Z_N)$ is the normal-line vector N in the object coordinate system, R is the coordinate conversion matrix mentioned above and $(X_P, Y_P, Z_P)$ is the normal-line vector P. With reference also to FIG. 11A, the normal-line vector N as expressed in the object coordinate system having axes $X_0$, $Y_0$, and $Z_0$ is illustrated therein relative to the triangular area it represents. As also shown in FIG. 11A, the axes X, Y and Z of a screen coordinate system are overlaid for illustrating that is necessary to rotate the normal-line vector N by means of the coordinate conversion matrix R in accordance with formula (4) in order to represent the normal-line vector in accordance with the screen coordinate system and the vector P $(X_P, Y_P, Z_P)$.

Then the inner product of the light source vector L and the normal-line vector P which was obtained by means of the formula (4) is then produced as follows according to formula (5A):

$$P \times L = (X_P, Y_P, Z_P) \times (X_L, Y_L, Z_L) \tag{5A}$$

$$= X_P \cdot X_L + Y_P \cdot Y_L + Z_P \cdot Z_L$$

A drawing color D for each apex point is then obtained by means of the formula (5B):

$$(R_D, G_D, B_D) = (P \times L) \times (R_C, G_C, B_C) \tag{5B}$$

wherein $(R_C, G_C, B_C)$ is a color vector of the relevant apex point and $(R_D, G_D, B_D)$ is the drawing color D for the apex point.

In a step SP3 of FIG. 10, it is determined whether the drawing colors and the coordinate values of all of the three apex points $S_0$, $S_1$, and $S_3$ of the triangle have been found. If not, processing continues by returning to the step SP2 for finding the coordinate values and drawing colors of the next apex point. If, however, all such coordinate values and drawing colors have been found, processing continues in a step SP4 for finding the coordinate values of the all of the intermediate points of pixels within the triangle by means of the raster processor 62 as shown in FIG. 8 and the drawing colors thus obtained and represented by corresponding coordinate values are written in the video memory 5.

With reference also to FIG. 11B, the coordinate values and the drawing colors of the three apex points $S_0$, $S_1$ and $S_2$ of the triangle are represented as follows:

$S_0$ $(X_0, Y_0, R_0, G_{0, B0})$
$S_1$ $(X_1, Y_1, R_1, G_1, B_1)$
$S_2$ $(X_2, Y_2, R_2, G_2, B_2)$

As shown in FIG. 11B, the triangle which is delimited by these three apex points is sliced in the horizontal direction by a line segment having the end points A and B corresponding with boundary points of the triangle. The coordinate points and drawing colors for each of a plurality of boundary points A and B for each of n raster lines are found by interpolation as follows: if the coordinate values of the boundary points A and B are given by A $(X_A, Y_A, R_A, G_A, B_A)$
B $(X_B, Y_B, R_B, G_B, B_B)$
the coordinate values and the drawing colors of the boundary point A is determined by the following formulas (6) through (10):

$$X_A = X_0 \times (Y_1 - Y_0 - n)/(Y_1 - Y_0) + X_1 \times n/(Y_1 - Y_0) \tag{6}$$

$$Y_A = Y_0 + n \tag{7}$$

$$R_A = R_0 \times (Y_1 - Y_0 - n)/(Y_1 - Y_0) + R_1 \times n/(Y_1 - Y_0) \tag{8}$$

$$G_A = G_0 \times (Y_1 - Y_0 - n)/(Y_1 - Y_0) + G_1 \times n/(Y_1 - Y_0) \tag{9}$$

$$B_A = B_0 \times (Y_1 - Y_0 - n)/(Y_1 - Y_0) + B_1 \times n/(Y_1 - Y_0) \tag{10}$$

The coordinate values and the drawing colors for the point B are then determined in accordance with the following formulas (11) through (15):

$$X_B = X_0 \times (Y_2 - Y_0 - n)/(Y_2 - Y_0) + X_2 \times n/(Y_2 - Y_0) \tag{11}$$

$$Y_B = Y_0 + n \tag{12}$$

$$R_B = R_0 \times (Y_2 - Y_0 - n)/(Y_2 - Y_0) + R_2 \times n/(Y_2 - Y_0) \tag{13}$$

$$G_B = G_0 \times (Y_2 - Y_0 - n)/(Y_2 - Y_0) + G_2 \times n/(Y_2 - Y_0) \tag{14}$$

$$B_B = B_0 \times (Y_2 - Y_0 - n)/(Y_2 - Y_0) + B_2 \times n/(Y_2 - Y_0) \tag{15}$$

Then coordinate values and drawings colors of intermediate points P along the segment from the point A to the point B are found by interpolation from the corresponding values of the boundary points A and B and are represented by the following expression:

P $(X_P, Y_P, R_P, G_P, B_P)$ the values of which are produced by means of the following formulas (16) through (20).

$$X_P = X_A + m \tag{16}$$

$$Y_P = Y_A \tag{17}$$

$$R_P = R_A \times (X_B - X_A - m)/(X_B - X_A) + R_B \times m/(X_B - X_A) \tag{18}$$

$$G_P = G_A \times (X_B - X_A - m)/(X_B - X_A) + G_B \times m/(X_B - X_A) \tag{19}$$

$$B_P = B_A \times (X_B - X_A - m)/(X_B - X_A) + B_B \times m/(X_B - X_A) \tag{20}$$

Then the pixel values $(R_P, G_P, B_P)$ of each intermediate point P are then written in the display area 51 of the video memory 5 as shown in FIG. 8 according to the coordinate values of each intermediate point P.

In a step SP5 of FIG. 10, it is determined whether coordinate values for each of the triangles have been produced as well as the related drawing colors, and whether the drawing colors have been accordingly written in the display area 51 of the video memory 5. If such operations have been carried out for each triangle, the picture data thus stored in the display area 51 of FIG. 8 is output by the graphic processor 6 as the three-dimensional picture $VD_1$ as illustrated in FIG. 8. If, however, such operations have not been carried out in their entirety, processing reverts to the step SP1 wherein the information necessary for producing the picture data for the next triangle is read from the main memory 2 of FIG. 8.

Figure 12:
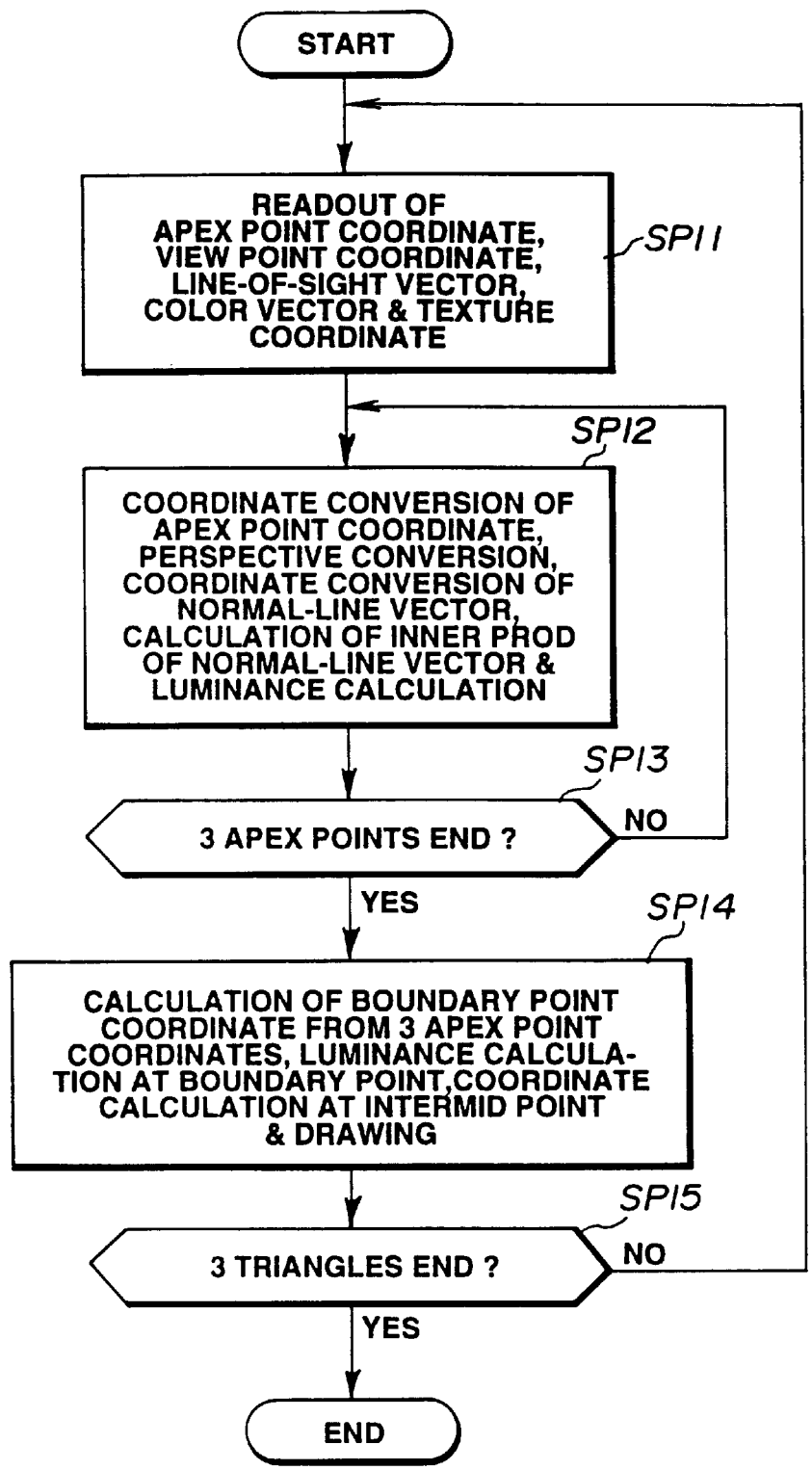
FIG. 12 is a flow chart for use in illustrating processing in accordance with the second embodiment of the picture formulating method.

Referring now to FIG. 12, a sequence of operations which is carried out for producing and displaying a three-dimensional picture by the texture mapping method of the first embodiment of the present invention is illustrated therein.

In a step SP11 of FIG. 12, the CPU 1 of FIG. 7 reads the necessary information for producing the picture of a selected triangle from the main memory 2 thereof, namely, the coordinates of the its apex points in the object coordinate system, the coordinate conversion matrix from converting the apex point coordinates into the world coordinate system, the parallel translation vector T, the line-of-sight vector for representing the apex point coordinates in the world coordinate system according to the screen coordinate system, the normal-line vector N and apex point coordinates of a storage area for relevant texture data. As the data is read in sequence by the CPU 1, it is routed thereby to the graphic processor 6.

In a step SP12 of FIG. 12, the coordinate values of the apex points of the triangle and luminance data therefor are produced using the information read in the step SP11. First, in the geometry processor 61 (FIG. 8), the three-dimensionally represented apex point coordinates are converted by means of the coordinate conversion matrix R and the parallel translation vector T, as described above, into the coordinates S in accordance with formula (1). Thereafter, the coordinates S are perspective-converted in accordance with the formulas (2) and (3) for conversion to screen coordinates (X, Y).

Also, the normal-line vector N of the triangle is converted into the normal-line vector P in accordance with formula (4) above by means of the coordinate conversion matrix R. Then the inner produce of the normal-line vector P and the light source vector L is determined in accordance with formula (5A) to yield a lighting quantity $1_Q$ as represented by formula (21).

$$1_Q = (P \times L) \tag{21}$$

In a step SP13 of FIG. 12, it is then determined by the geometry processor 61 whether the luminance data and coordinate values of three apex points of the triangle have been found. If not, processing reverts to the step SP12 for finding the luminance data and coordinate values of the next apex point of the triangle. If, however, all such values have been found, processing continues in a step SP14 for finding all of the texture coordinate values of the intermediate points within the triangle from the texture picture data 52 as illustrated in FIG. 9, with the use of the raster processor 62. Then the luminance data represented by corresponding coordinate values of the display area 51 of FIG. 9 and associated with corresponding texture coordinate values are multiplied by picture data represented by the texture coordinates. The resulting values are written at locations of the display area 51 in accordance with corresponding coordinate values.

Figure 13:
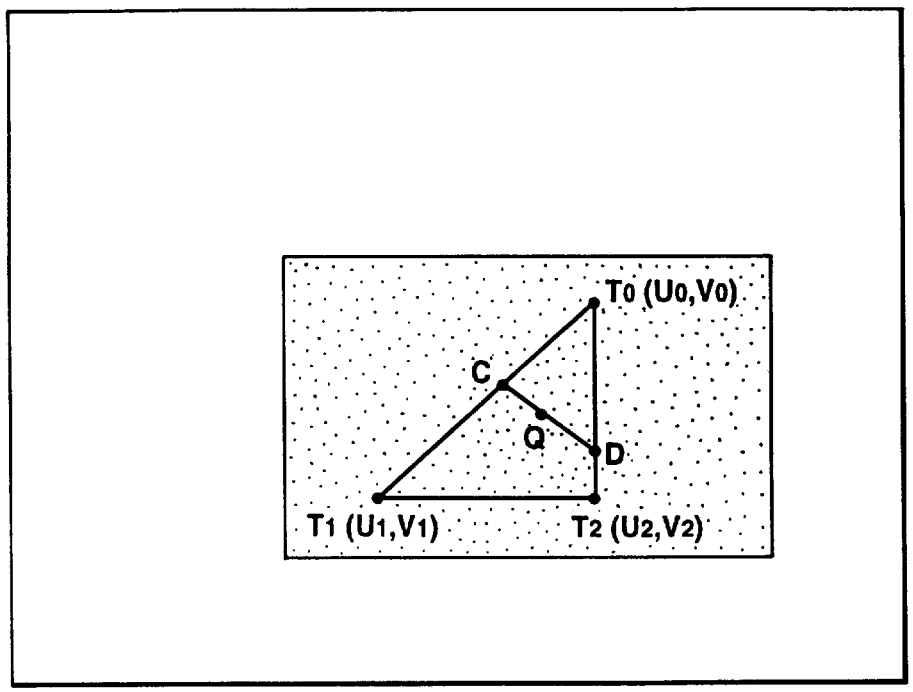
FIG. 13 illustrates texture coordinates used in carrying out the second embodiment of the picture formulating method.

With reference also to FIG. 13, the coordinate values of the three apex points $T_0$, $T_1$ and $T_2$ of the triangle within the texture picture 52 which are to be mapped to the object picture are represented as $T_0$ $(U_0, V_0)$ $T_1$ $(U_1, V_1)$ $T_2$ $(U_2, V_2)$ and wherein coordinate values of a boundary point C between the points $T_0$ and $T_1$, a boundary point D between the points $T_0$ and $T_2$, as well as an intermediate point Q on a line segment defined by the points C and D, are represented as:

C $(U_C, V_C)$

D $(U_D, V_D)$

Q $(U_Q, V_Q)$

Since the three apex points of the triangle within the texture picture 52 are each associated with a corresponding one of the three apex points of the triangle within the object picture, the coordinate values of the three apex points of the triangle within the object picture, as well as luminance data and texture coordinates of each point within the texture picture 52 may be represented as follows:

$S_0$ ($X_0$, $Y_0$, $L_0$, $U_0$, $V_0$)

$S_1$ ($X_1$, $Y_1$, $L_1$, $U_1$, $V_1$)

$S_1$ ($X_2$, $Y_2$, $L_2$, $U_2$, $V_2$)

Figure 14:
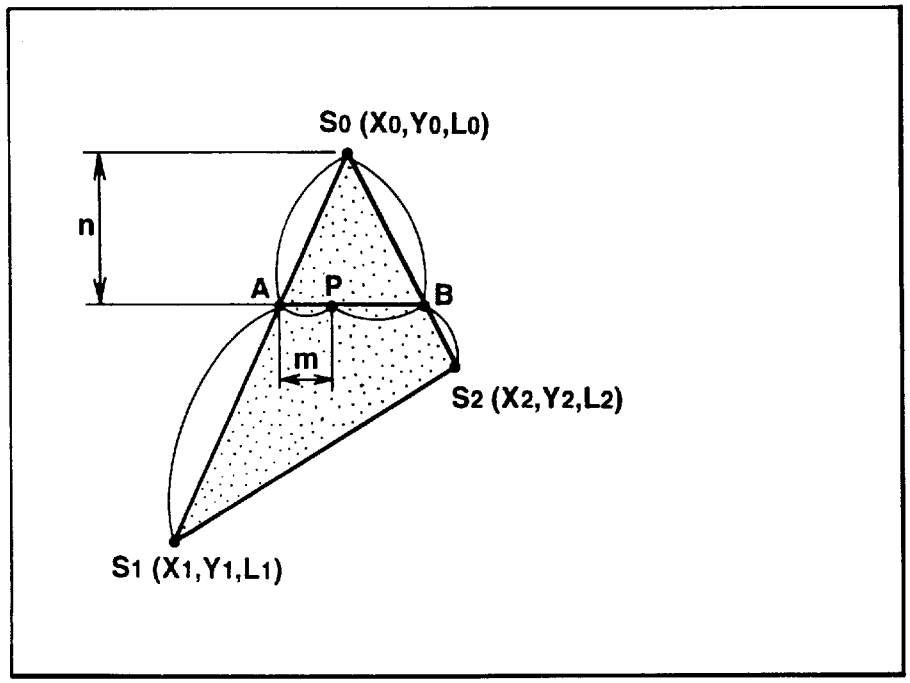
FIG. 14 illustrates coordinate values and luminance values of a triangular area as produced in accordance with the second embodiment of the picture formulating methods.

The triangle delimited by these three apex points $S_0$, $S_1$ and $S_2$ is sliced in the horizontal direction, as illustrated in FIG. 14, by a line segment defined by boundary points A and B as shown therein. The coordinate values and luminance data of the boundary points A and B for each of n raster lines are found by interpolation and are expressed as follows:

A ($X_A$, $Y_A$, $L_A$)

B ($X_B$, $Y_B$, $L_B$)

The coordinate values and luminance data of the boundary point A are determined in accordance with formulas (22) through (24) below, while the coordinates of the boundary point C providing texture coordinates for the boundary point A are determined in accordance with formulas (25) and (26) below:

$$X_A = X_0 \times (Y_1 - Y_0 - n)/(Y_1 - Y_0) + X_1 \times n/(Y_1 - Y_0) \quad (22)$$

$$Y_A = Y_0 + n \quad (23)$$

$$L_A = L_0 \times (Y_1 - Y_0 - n)/(Y_1 - Y_0) + L_1 \times n/(Y_1 - Y_0) \quad (24)$$

$$U_C = U_0 \times (Y_1 - Y_0 - n)/(Y_1 - Y_0) + U_1 \times n/(Y_1 - Y_0) \quad (25)$$

$$V_C = V_0 \times (Y_1 - Y_0 - n)/(Y_1 - Y_0) + V_1 \times n/(Y_1 - Y_0) \quad (26)$$

The coordinate values and luminance data of the boundary point B are determined in accordance with formulas (27) through (29), while the coordinates of the boundary point D providing texture coordinates for the boundary point B are determined in accordance with formulas (30) and (31) as follows:

$$X_B = X_0 \times (Y_2 - Y_0 - n)/(Y_2 - Y_0) + X_2 \times n/(Y_2 - Y_0) \quad (27)$$

$$Y_B = Y_0 + n \quad (28)$$

$$L_B = L_0 \times (Y_2 - Y_0 - n)/(Y_2 - Y_0) + L_2 \times n/(Y_2 - Y_0) \quad (29)$$

$$U_D = U_0 \times (Y_2 - Y_0 - n)/(Y_2 - Y_0) + U_2 \times n/(Y_2 - Y_0) \quad (30)$$

$$V_D = V_0 \times (Y_2 - Y_0 - n)/(Y_2 - Y_0) + V_2 \times n/(Y_2 - Y_0) \quad (31)$$

With reference again to FIG. 14, an intermediate point P along the line segment AB therein is shifted by a value n from the boundary point A towards the boundary point B. Coordinate values, luminance data and texture coordinates of the intermediate point P are produced by interpolation by means of the data of boundary points A and B. If the coordinates and luminance values of the intermediate point P are expressed as P ($X_P$, $Y_P$, $L_P$) the coordinates of an intermediate point Q as shown in FIG. 13 within the texture data and corresponding to the intermediate point P and providing its texture coordinates, are determined in accordance with the formulas (32) through (36) below:

$$X_P = X_A + m \quad (32)$$

$$L_P = Y_A \quad (33)$$

$$L_P = L_A \times (X_B - X_A - m)/(X_B - X_A) + L_B \times m/(X_B - X_A) \quad (34)$$

$$U_Q = U_C \times (X_B - X_A - m)/(X_B - X_A) + U_D \times m/(X_B - X_A) \quad (35)$$

$$V_Q = V_C \times (X_B - X_A - m)/(X_B - X_A) + V_D \times m/(X_B - X_A) \quad (36)$$

The formulas (35) and (36) serve to relate the texture coordinates $U_Q$ and $V_Q$ to the point P in order to access corresponding pixel data from the picture 52.

Pixel data read from the texture picture 52 in accordance with the coordinates corresponding to each intermediate point P, are then multiplied by the corresponding luminance data of that point. The resulting data is written at a corresponding location indicated by the coordinate values of the intermediate point P in the video memory 5.

Thereafter, in a step SP15 of FIG. 12, it is determined whether the operations of finding the coordinate values and luminance data for each of the triangles, as well as whether the drawing colors therefor have been written in the display area 51 of the video memory 5 of FIG. 9 have been completed. If so, the picture data stored in the display area 51 of FIG. 9 is output by the graphic processor 6 as the three-dimensional picture $VD_2$ of FIG. 9. If not, however, processing reverts to the step SP11 for finding the necessary data for the next triangle.

The methods described above for formulating a three-dimensional picture may be applied selectively depending on the characteristics of the picture to be displayed. For example, if the shape of an object to be displayed as a three-dimensional picture is critical at a given point during a game, a picture preferably is drawn by the shading method according to the first embodiment. However, if the pattern of the object's surface is deemed to be more important, the picture is preferably produced in accordance with the texture mapping method of the second embodiment.

A technique for formulating a picture using the texture mapping function described above and a picture data converting function by means of a conversion table utilizing the picture formulating apparatus of FIG. 7 will now be explained.

The CPU 1 of FIG. 7 reads out texture source picture data from the video memory 5 in accordance with a program stored in the main memory 2 and modifies the source picture data, if necessary, for writing in the video memory 5. Within the video memory 5, information pertinent to a picture to be output for display, such as texture source data and conversion data (such as a color lookup table) is written in a portion of the memory other than the display area in which data of the picture to be output, that is, the display output picture data (picture to be displayed by a device such as a TV receiver, monitor receiver or CRT display) is stored.

Figure 15A:
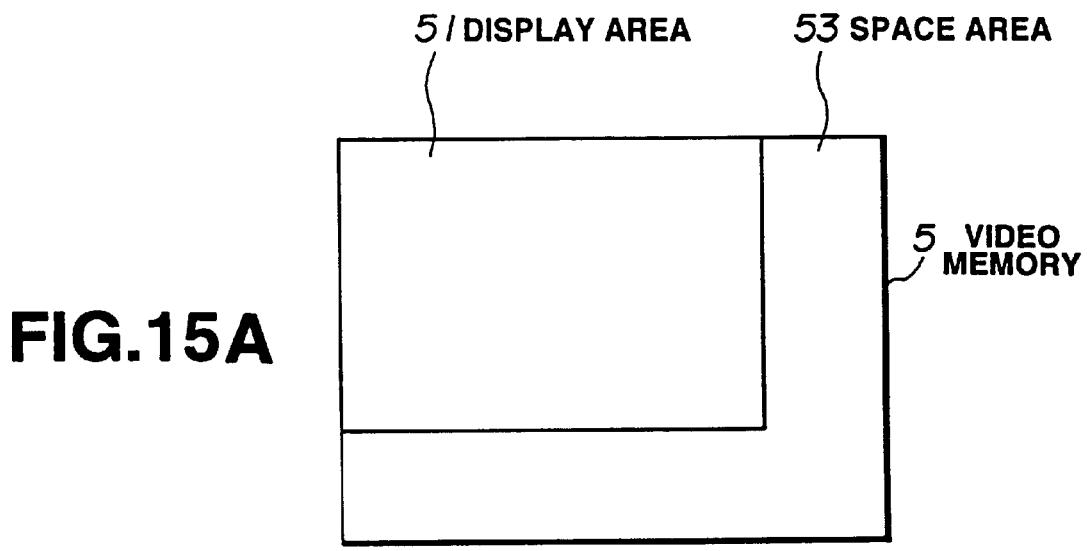
FIGS. 15A through 15C illustrate the utilization of memory space in a video memory used in carrying out the method in accordance with the second embodiment.
Figure 15B:
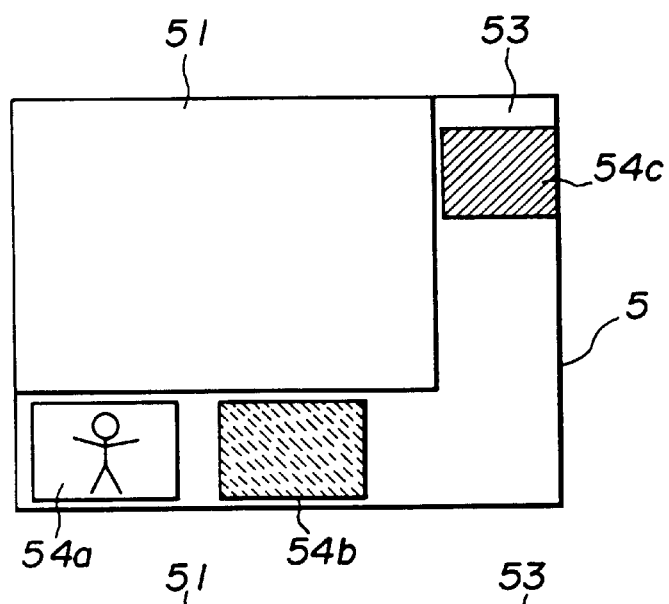
Figure 15C:
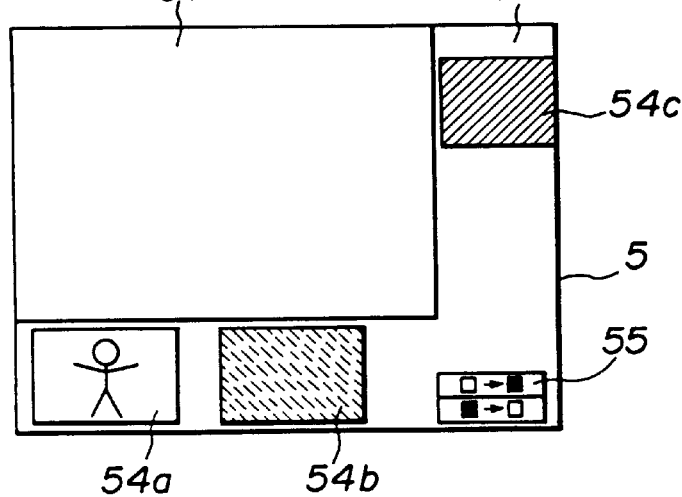

FIG. 15A schematically illustrates the memory space of the video memory 5 in an initial state wherein the memory space is divided into the above-mentioned display area 51 and a vacant area 53 outside the display area 51. For example, a picture to be displayed on a CRT display device may include 400 vertical lines by 640 horizontal pixels or possibly 480 vertical lines by 720 horizontal pixels, whereas a typical video memory is provided with vertical and horizontal memory dimensions set equal to powers of 2. In either exemplary memory application, therefore, a memory having 512 vertical lines by 1024 horizontal words is required, so that redundant space is formed in both the vertical and horizontal directions of the memory space. With reference to FIG. 15B, in the vacant area 53 several pictures 54a, 54B and 54c are stored as picture sources. Referring also FIG. 15C, a conversion table 55, such as a color lookup table is also written in the area 53.

Figure 16:
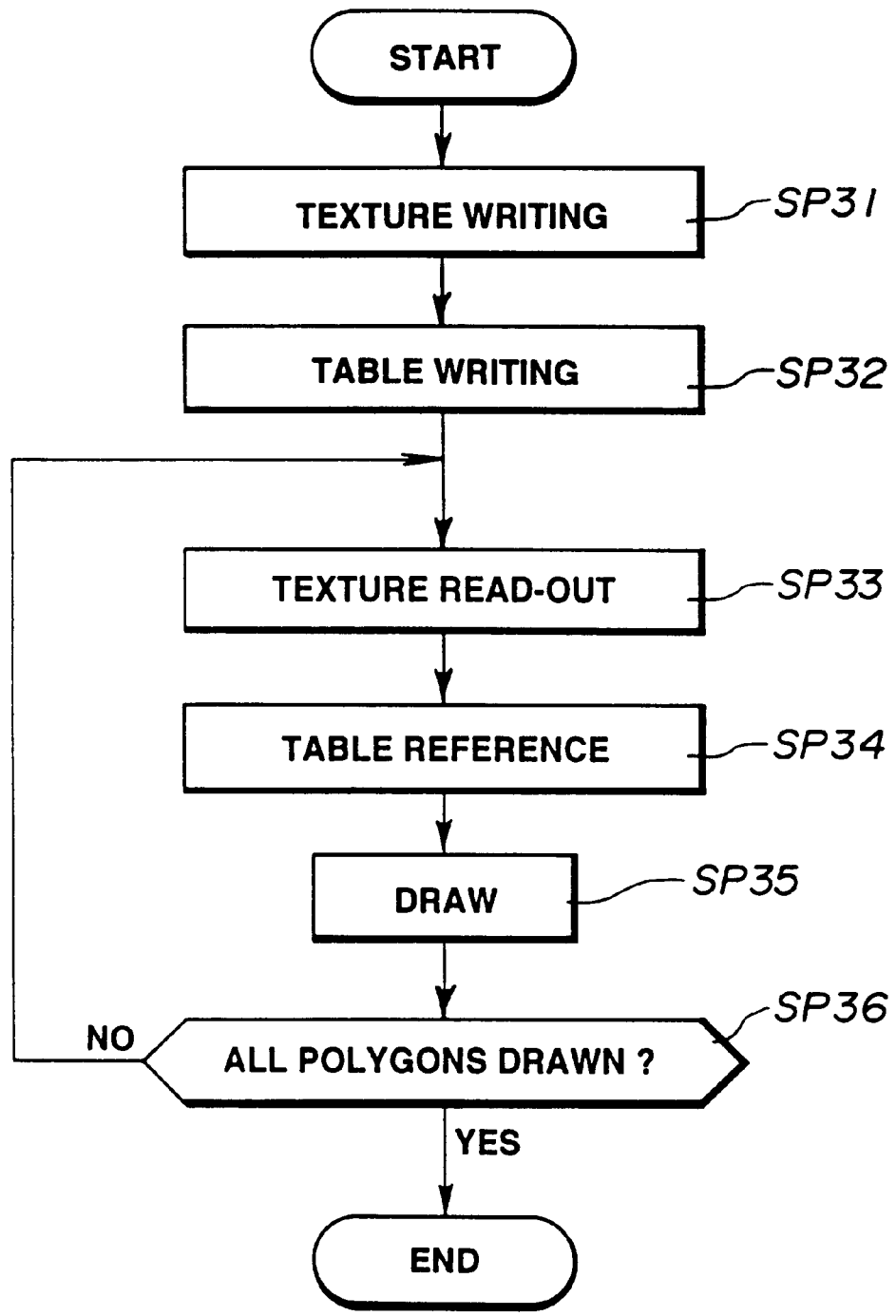
FIG. 16 is a flow chart for use in illustrating processing according to the method of the second embodiment.

FIG. 16 provides a flow chart illustrating a typical processing sequence in accordance with this technique. In a step SP 31 of FIG. 16, the CPU 1 causes the texture source picture 54a through 54c to be written in the vacant area 53 of the video memory 55 before generating or formulating the display output picture data. At a step SP 32, the conversion table 55 such as a color lookup table, which serves to convert virtual picture data into actual picture data is also stored in the vacant area 53. The texture source picture data may be obtained, for example, by reading from an external storage device such as a disk or tape.

In a step SP 33, the CPU 1 executes a program stored in the main memory 2 for generation or formulation of a pre-set picture and depending on the results of such processing, reads data from the texture source pictures 54a through 54c in the area 53. The texture source picture data thus read out are modified in a step SP 34, if necessary, by reference to the conversion table 55, and in a step SP 35 the picture data for writing in the display are 51 are drawn or produced. That is, the data obtained directly from the texture source pictures are used as addresses to the conversion table 55 for converting the texture source picture data, as virtual picture data, into real picture data. The real picture data read from the conversion table 55 consequently, are written in the display area 51 of the video memory 55.

In a step SP 36, it is determined whether all picture drawing operations have been completed for all of the polygonal areas comprising the display output picture stored in the display area 51. If not, the operations of steps SP 33 through SP35 are repeated. If so, however, the picture drawing operations are terminated.

Figure 17:
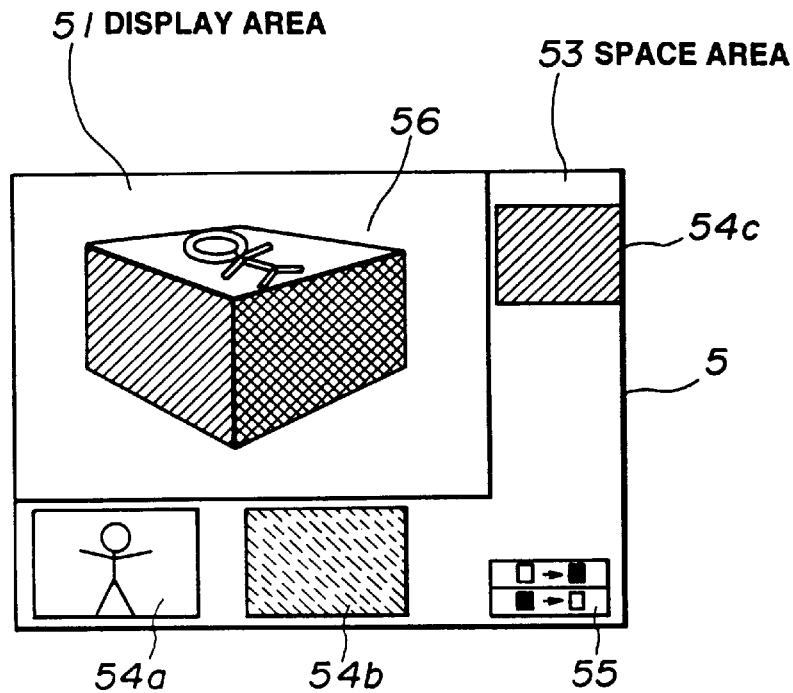
FIGS. 17A and 17B represent utilization of memory space and the display of an output picture, respectively, in accordance with a method of the present invention employing a conversion table.
Figure 17:
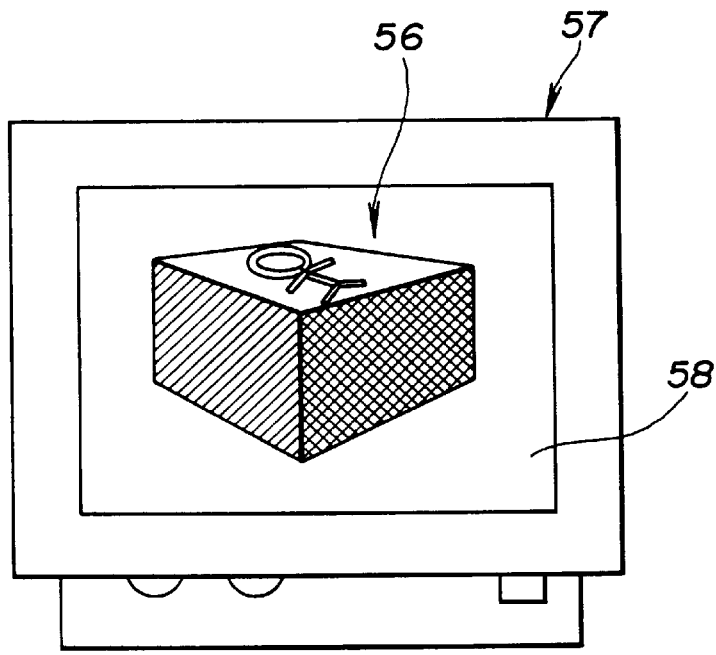

With reference also to FIG. 17A, the state of the video memory 5 once the foregoing picture formulating operations have been completed is represented thereby, and with reference also to FIG. 17B, the display state of a CRT display device 57 employed to display a picture 56 thus formulated in the display area 51 of the memory 5 is provided. With reference to FIG. 17A, the picture data in the display area 51 is read out in accordance with video synchronization signals and output after conversion into analog form by a D/A converter (not shown for purposes of simplicity and clarity) for displaying the picture 56 on a screen surface 58 of the CRT display device 57 in FIG. 17B.

Figure 3:
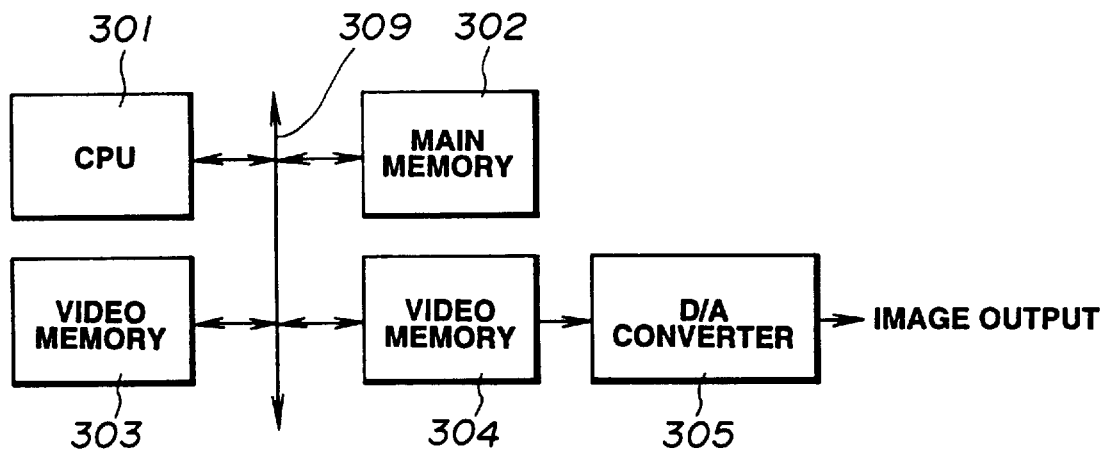
FIG. 3 is a block diagram of a further picture formulating apparatus which carries out a texture data mapping function.
Figure 5:
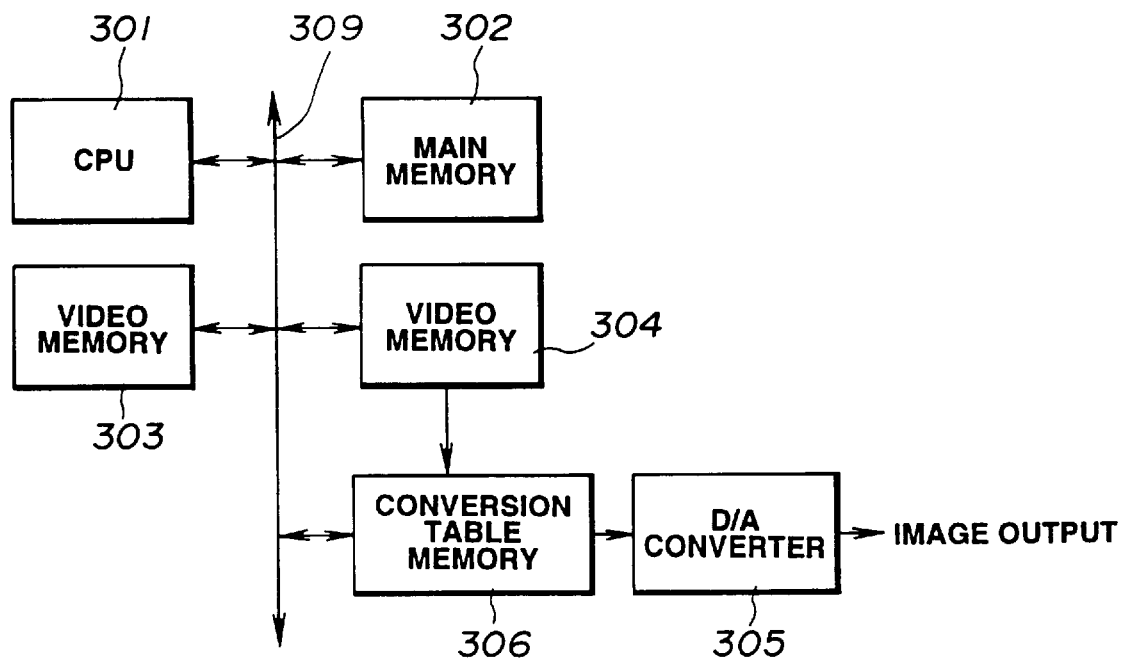
FIG. 5 is a block diagram of a further picture formulating apparatus which serves to convert picture data with the use of a conversion table.

In the present embodiment, since the texture source pictures 54a through 54c and/or the conversion table 55 (such as a color lookup table) are stored in the vacant area 53 of the memory 5 outside the display area 51 thereof, neither a separate video memory 303 (as in the apparatus of FIG. 3) for storing the texture source pictures nor a separate conversion table memory 306 (as in the apparatus of FIG. 5) for storage of conversion tables is required, thus to permit a reduction in size of the apparatus and reduced production costs therefor. Moreover, since virtual data obtained directly from the texture source pictures 54a through 54c in the vacant area 53 of the memory 5 are converted by reference to the conversion table 55 into real picture data which is then written in the display area 51, there is no necessity to provide a separate bus for accessing a conversion table in a separate memory (such as the memory 306 of FIG. 5) which assists further in reducing apparatus size and production costs.

Moreover, the display area in the video memory 5 may be moved to permit the previously formulated display output picture itself to be used as a texture source picture, that is, as a reference picture for practicing a picture formulation technique in accordance with a further embodiment of the present invention. This embodiment is now explained in connection with FIGS. 18A and 18B.

Figure 18A:
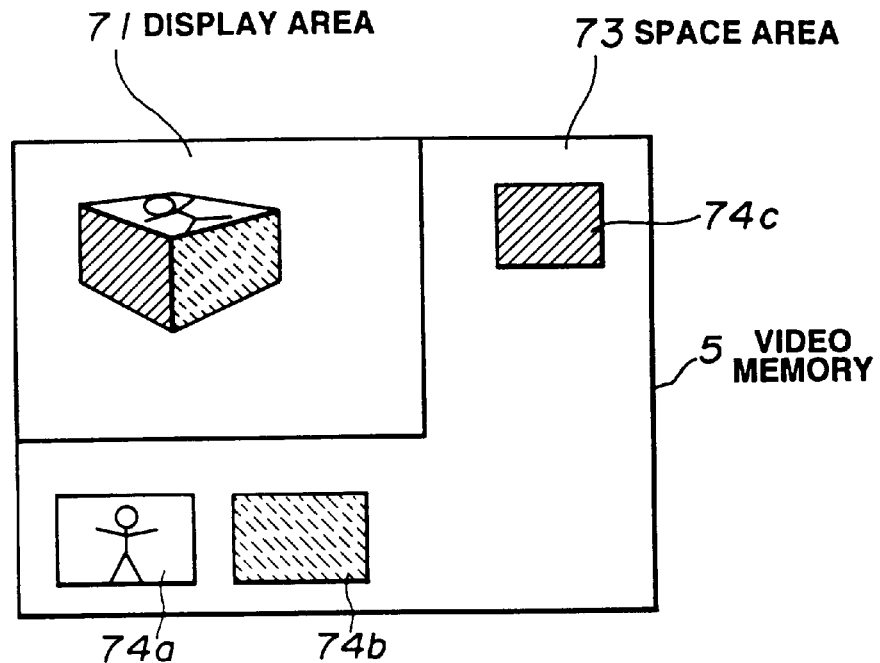
FIGS. 18A and 18B illustrate the usage of video memory area in accordance with a further embodiment of the present invention.

With reference first to FIG. 18A, the contents of the video memory 5 during an arbitrary Nth frame are illustrated thereby. During the Nth frame, a display area 71 of the video memory 5 is provided at a pre-set location therein and a number of texture source pictures 74a, 74b and 74c are stored in a vacant area 73 of the video memory 5 apart from the display area 71. As explained below, during a following (N+1)th frame, at least a portion of the picture formulated during the Nth frame and written in the display area 71 is used directly as texture source data for producing a further display output picture.

Figure 18B:
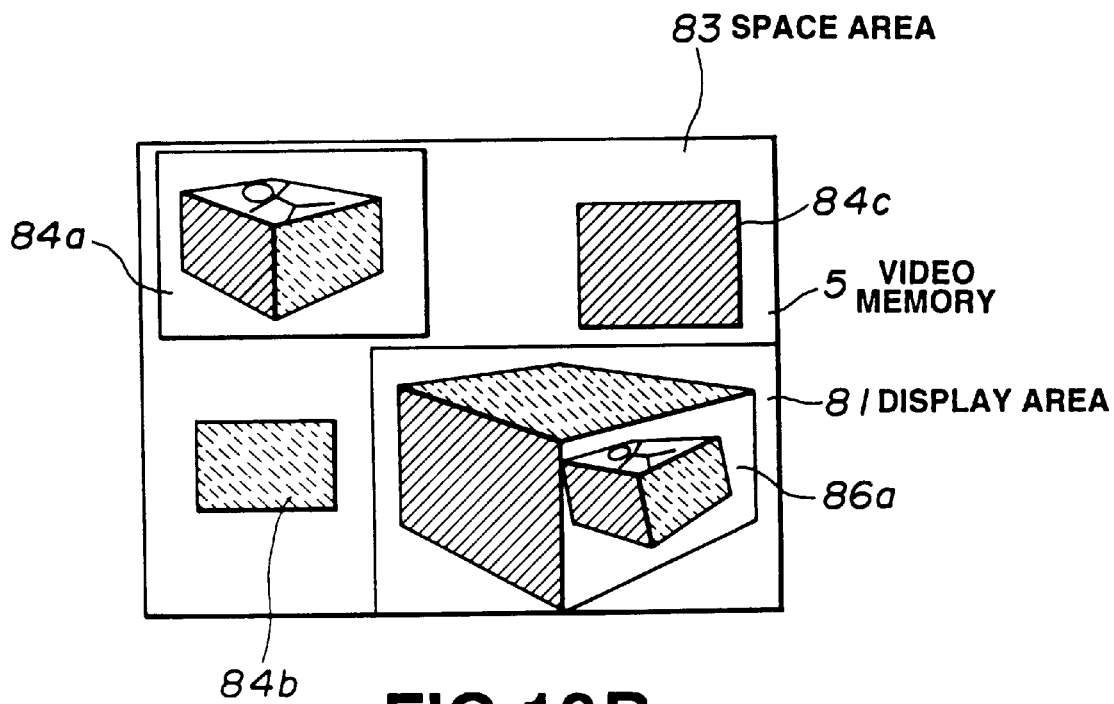

With reference now to FIG. 18B the contents of the video memory 5 during the next (N+1)th frame are illustrated therein. At that time, a display area 81 is provided in the video memory 5 at a location differing from the position of the display area 71 of FIG. 18A. In a vacant area 83 apart from the display are 81, those portions of the picture previously written in the display area 71 which are required to formulate data for storage in the display area 18 to formulate a new picture are stored as a new texture source picture 84a as shown in FIG. 18B. That is, the display area 81 is selected so that it does not overlap those portions of the display area of the Nth frame containing the new texture source picture 84a. In addition, a number of texture source pictures 84b and 84c as required are also stored in the area 83. Then the texture source picture data 84a is read and modified in the same manner as other texture source data for writing in the display area 81 to formulate picture data 86a for the (N+1)th frame.

Accordingly, with the use of this method a picture previously generated by the computer may be employed directly as texture source data for generating or formulating a picture.

A game playing apparatus in accordance with an aspect of the present invention, employing features of the above-described picture formulating methods and apparatus, will now be explained.

Figure 19:
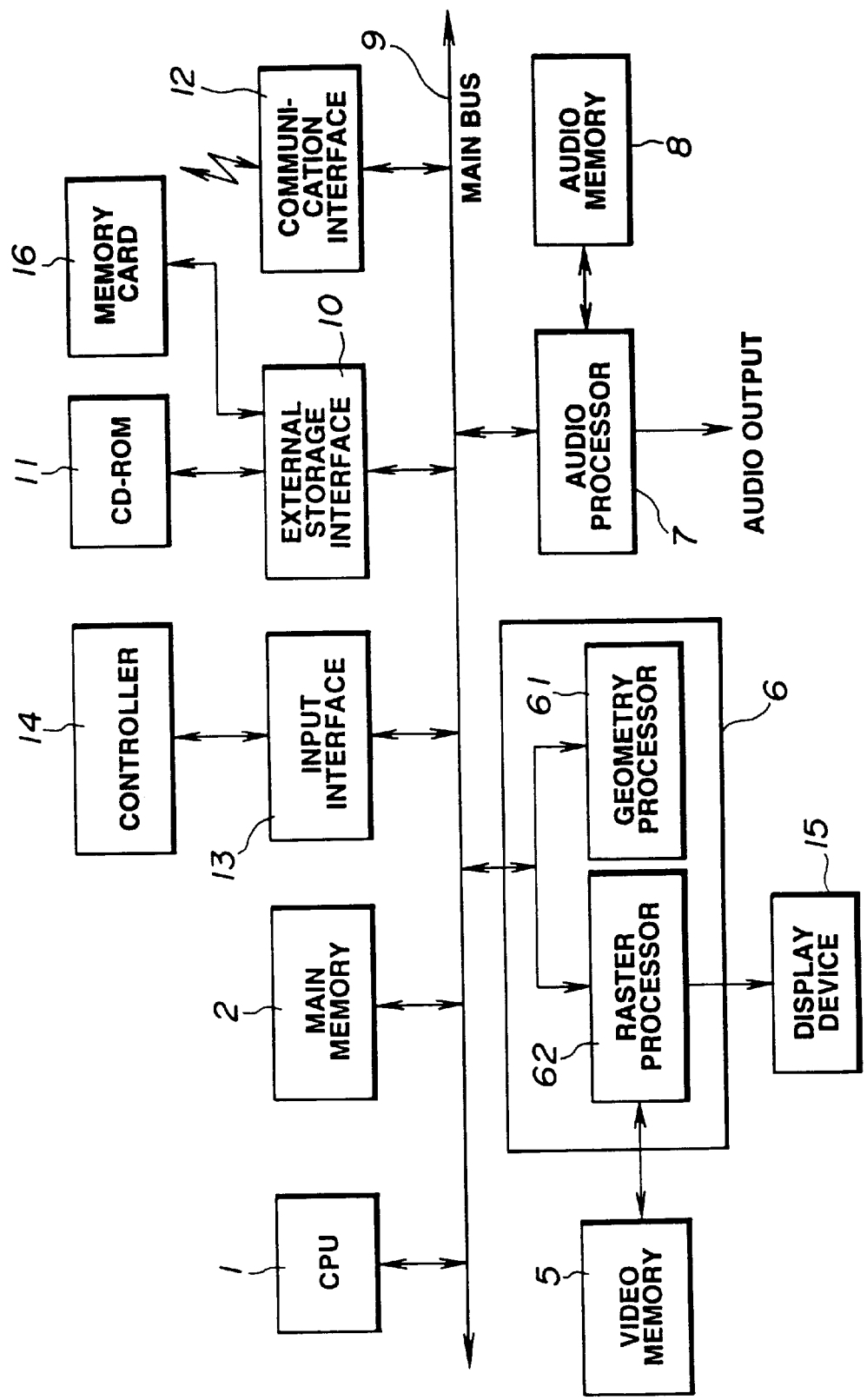
FIG. 19 is a block diagram of a household game playing apparatus in accordance with another embodiment of the present invention.

With reference to FIG. 19, a block diagram of an embodiment of a household game playing apparatus in accordance with the present invention is illustrated therein. In the embodiment of FIG. 19, a game program is stored in a CD-ROM 11, a read-only memory employing a compact disc as an external storage medium. In the alternative, a memory card 16 employing a non-volatile memory such as a flash memory, may be employed for the purpose of storing such a game program. A further alternative is the use of a ROM cartridge, not shown for purposes of simplicity and clarity. As yet another alternative, the game program may be received over an external network via a communication interface 12.

The game program and accompanying three-dimensional picture information are entered from the CD-ROM 11 which is connected to an external storage interface 10, or in the alternative from the memory card 16 through the external storage interface 10 or from an external network connected to the communication interface 12, under the control of the CPU 1, such as a microprocessor. The game program and the three-dimensional picture information are stored over the main bus 9 and the main memory 2. Operating information is input from a controller 14, such as an input pad or a joystick when the same is fetched by the CPU 1 from the input interface 13 via the main bus 9. Based on the operating information thus obtained by the CPU 1, the three-dimensional picture information stored in the main memory 2 is converted by the graphic processor 6 for generating picture data for display. A three-dimensional picture is drawn in the video memory 5 by the graphic processor 6 with the aid of the picture data. The three-dimensional picture data thus drawn on the video memory 5 are read synchronously with the scanning of video signals for displaying the three-dimensional picture on a display device 15, such as a monitor.

Simultaneously as the three-dimensional picture is thus displayed, voice information associated with the displayed three-dimensional picture and included in the operating information fetched by the CPU 1 is routed to an audio processor 7. Based on such voice information, the audio processor 7 outputs appropriate voice data which is stored permanently in the audio memory 8.

Figure 20:
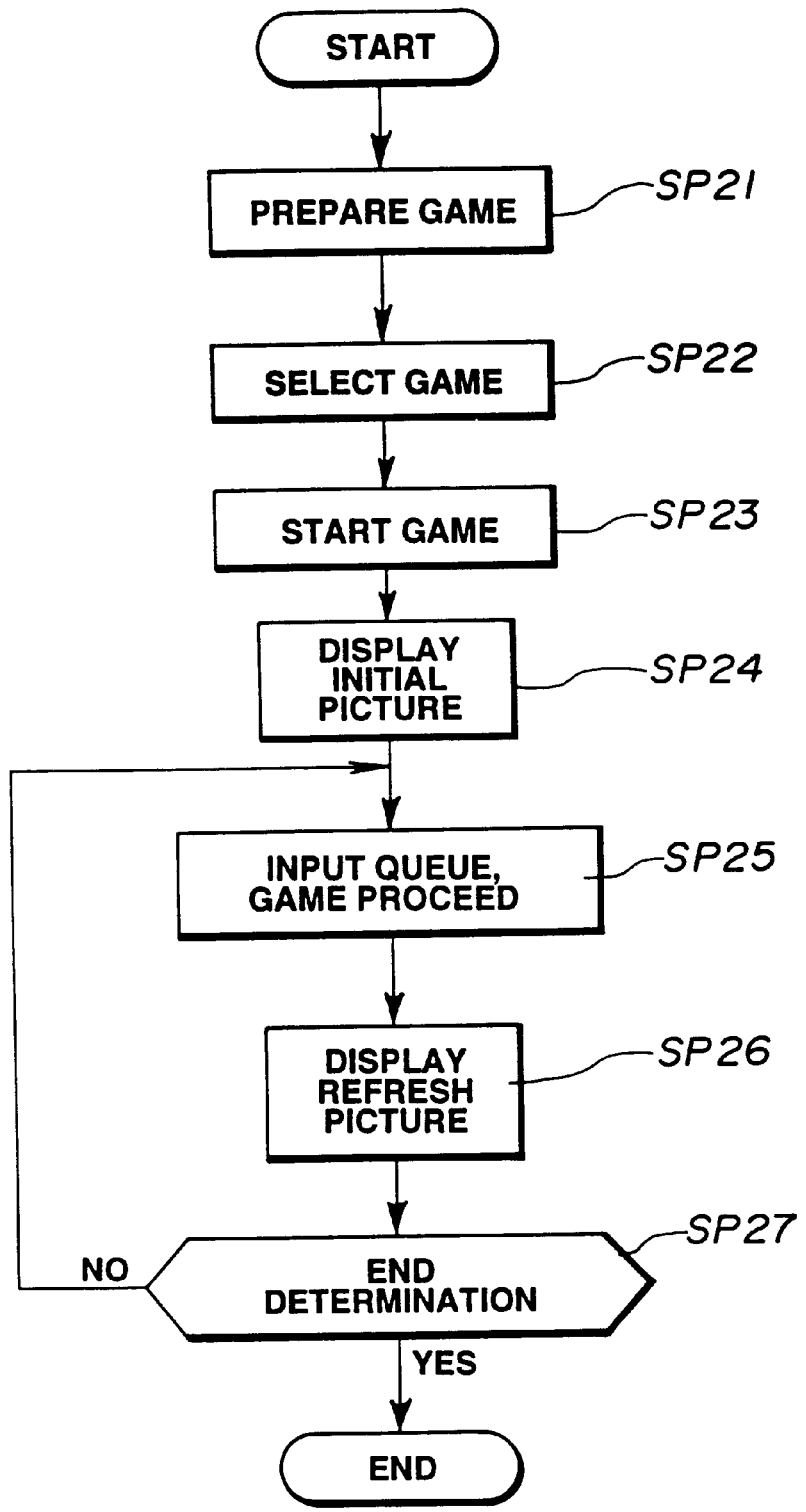
FIG. 20 is a flow chart for use in explaining the operation of the household game playing apparatus of FIG. 19.

With reference also to FIG. 20, a flow chart is provided therein for illustrating the operating sequence for initiating and carrying out a computer game by means of the household game playing apparatus in accordance with the present embodiment. For example, and with reference also to FIG. 21, a computerized driving game in which a car is driven on a road 22 with the object of avoiding a building 23 and given terrain 21 is implemented by the present embodiment utilizing the above-described texture mapping method.

With reference to FIG. 20 in a step SP 21, the external memory medium (such as the CD-ROM 11 or the memory card 16) is mounted via the external storage interface 10 on a main portion of the household game playing apparatus. In the alternative, the apparatus is connected via the communication interface 12 to the external network, as mentioned above. Necessary information, such as the game program, functions, libraries and picture information is fetched to the main memory 2 from the external memory medium for storage or loading. Terrain data, building data, road data and texture data are loaded at this time as such picture information. In addition, the picture data are loaded directly from the external memory medium to the vacant area in the video memory 5 without the intermediate step of storing the same in the main memory 2.

Processing then continues in a step SP 22 in which one of a plurality of games stored in the external storage medium, or else provided by the external network, is selected for play and a mode of execution for the selected game is also selected. This operation is carried out in dependence on variables stored in the main memory 2 or based on the value of the register of the CPU 1.

The game program is then executed at a step SP 23 under the control of the CPU 1 in order to start the computer game.

An initial picture indicating that the game has started is formulated in a step SP 24 and displayed. A concrete example of such a picture is that illustrated in FIG. 21. This picture is formulated by carrying out the following sequence of operations.

Figure 21:
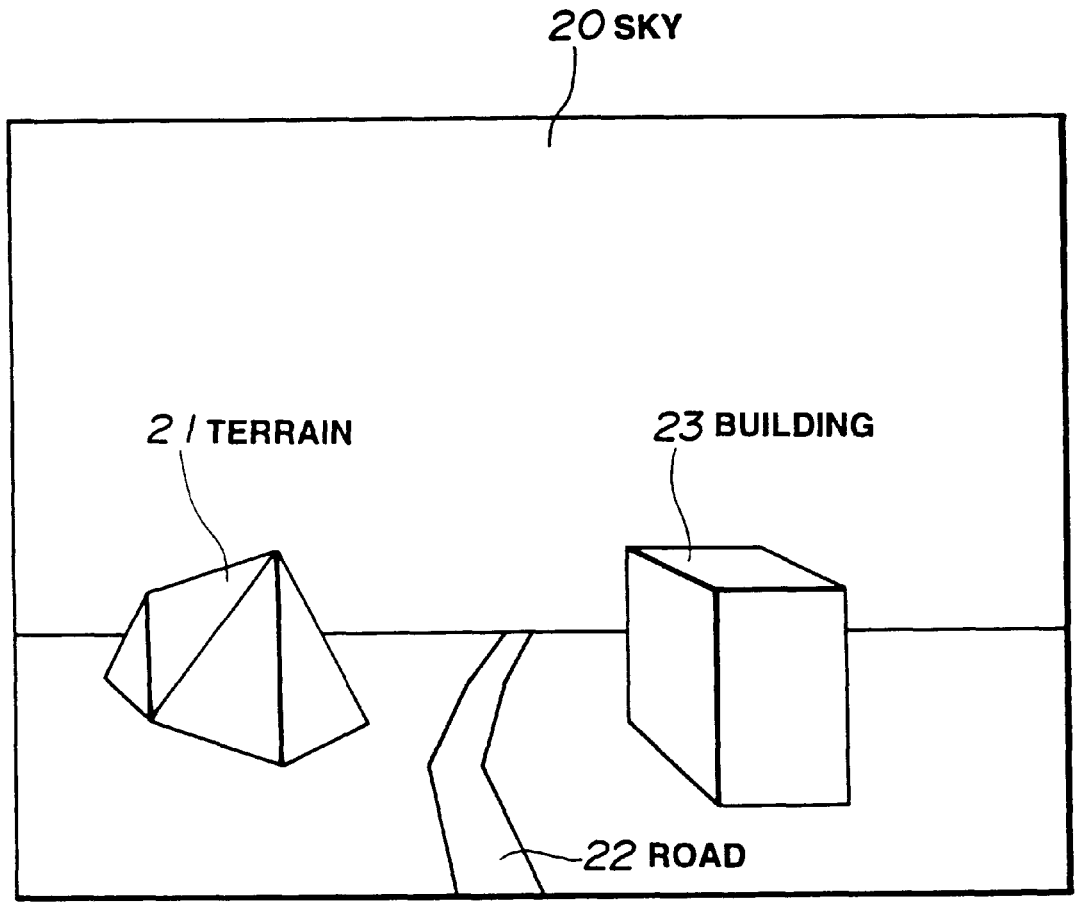
FIG. 21 is an exemplary display produced with the use of the household game playing apparatus of FIG. 19.

In formulating the picture of FIG. 21, a remote scene is first prepared and displayed. For example, a portion 20 representing the sky which is the farthest portion of the picture from the plane of the screen or the position of the viewer is initially formulated and displayed. Color data for the sky portion 20 is read from the main memory 2 by the CPU 1, that is, coordinate data of the four corners of the screen and color data for the sky portion 20 are output to the raster processor 62 within the graphic processor 6. In the raster processor 62, relatively small polygonal areas (also referred to as "polygons") are formulated in the color of the sky 20 for depiction by the display device 15.

The terrain portion 21 is then displayed. The CPU 1 causes coordinates of the three-dimensional apex points of the polygons comprising the terrain 21 to be read from the main memory 2 for supply to the geometry processor 61. The processor 61 executes coordinate conversion and prospective conversion of the three-dimensional apex point coordinates to yield two-dimensional screen coordinate values, and also produces texture coordinate values associated with such two-dimensional coordinate values. The texture coordinate values thus produced are output to the raster processor 62 which reads out texture data corresponding to the input texture coordinate values from texture data stored in the video memory 5 in order to modify such texture data to conform to the polygons defined by the two-dimensional coordinate values to write the modified data in the video memory 5. The above operations are carried out for all of the polygons making up the terrain 21 and then the terrain 21 is displayed in its entirety by the display device 15.

Accordingly, as explained with reference to FIGS. 9 and 12 through 18, a three-dimensional picture may be produced and displayed employing the texture mapping method described hereinabove involving the production of texture coordinate values, as well as coordinate values and luminance data of the apex points of the polygons, and then writing texture data corresponding to the texture coordinate values as pixel data.

In addition, if texture data are used for formulating a picture of the road 22 and of the building 23, similar processing operations are carried out therefor as in the case of the terrain 21. If texture data are not used for formulating pictures of the road 22 and the building 23, color data for the polygons used to represent the road 22 and the building 23 are read from the main memory 2 and appropriate processing operations similar to those used for formulating the picture of the terrain 21 are carried out for formulating and displaying the road 22 and the building 23 by means of the display device 15.

Once the picture has been displayed in the foregoing manner, processing continues in a step SP 25 where a standstill state for the game is set until a button or lever provided in a controller 14, such as a game controller or a game pad, are actuated by a game operator. If the controller 14 is actuated, data corresponding to the actuation is then fetched by the CPU 1 via the interface 13 and the game proceeds in accordance with the data thus obtained. Speed and direction information for the car to be driven as displayed are determined by data input with the use of the controller 14, and the position and orientation of the terrain 21, road 22, and building 23 as displayed is changed as required in accordance with the input data. Such changes are carried out by changing variables stored in the main memory 2 or values stored in a register of the CPU 1.

In a step SP 26 a picture modified in accordance with data entered by means of a controller 14 as the computer game progresses is sequentially formulated in accordance with the above-described method and then displayed. The audio processor 7 fetches voice data matching the progress of the computer game from the audio memory 8 and outputs the fetched data.

At a step SP 27, it is determined depending on the progress of the game and based on the intent of the operator as expressed by operating the controller 14 or other appropriate input device, whether or not the game is to be terminated. If the game is not to be terminated, control reverts to the step SP 25 to await data representing the next operation to be entered from the controller 14. If the game is to be terminated, data representing the state of the game progress is stored in storage means, such as a non-volatile memory (not shown for purposes of simplicity and clarity) before terminating the game.

From the foregoing, it will be appreciated that the methods and apparatus of the present invention may be adapted for use not only in household game playing apparatus but in other types of game playing apparatus, such as apparatus used in arcades. Moreover, the methods and apparatus of the present invention may also be employed for implementing flight simulators and other training devices, as well as virtual reality systems. Various other applications for the present invention will be apparent to those of ordinary skill in the art based on the foregoing disclosure.

Although specific embodiments of the invention have been described in detail herein with reference to the accompanying drawings, it is to be understood that the invention is not limited to those precise embodiments, but that various changes and modifications may be effected therein by one skilled in the art without departing from the scope of spirit of the invention as defined in the appended claims.

What is claimed is:

1. A method for formulating image signals for producing a three-dimensional picture display comprising the steps of:

reading out first coordinate data for apex points of a plurality of polygonal picture areas as units of a desired three-dimensional picture stored in a first memory;

producing second coordinate data representing coordinates of the apex points on a predetermined screen based on the first coordinate data;

producing color data for each of said apex points;

producing color data and coordinate data of boundary points between the apex points using the color data and the coordinate data of each of said apex points on the predetermined screen;

producing color data and coordinate data of intermediate points between said boundary points using the color data and the coordinate data of said boundary points;

forming image signals for producing a three-dimensional picture from the produced data and from other data;

storing said image signals in a first storage area of a second memory; and storing the other data in a second storage area of said second memory other than the first storage area thereof.

2. The method of claim 1, further comprising the steps of modifying two-dimensional texture data, mapping the modified texture data onto the intermediate points, and displaying the three-dimensional picture based on the modified texture data.

3. A method according to claim 2, further comprising the steps of obtaining texture coordinates indicating coordinate positions of the two-dimensional texture data and mapping the modified texture data onto the intermediate points with the use of said texture coordinates.

4. The method of claim 1, wherein the step of producing color data and coordinate data of said boundary points comprises selecting said boundary points at locations at respective ends of a line segment extending along a horizontal direction of said predetermined screen extending across a respective one of the polygonal areas at a predetermined distance from a respective one of the apex points thereof, and the step of producing color data of the intermediate points comprises producing color data of ones of said intermediate points along said line segment by interpolation of color data of said boundary points at the ends of said line segment.

5. An apparatus for formulating image signals representing a three-dimensional picture for displaying said three-dimensional picture with the use of said image signals, comprising:

a first memory for storing first coordinate data of apex points of a plurality of polygonal areas as units of a desired three-dimensional picture;

a processor for converting the first coordinate data of the apex points of the polygonal areas stored in said first memory to second coordinate data on a predetermined screen and for producing color data for each of said apex points, for producing color data and coordinate data of boundary points between said apex points based on the color data and the second coordinate data on the predetermined screen of the apex points, and for producing color data and coordinate data of intermediate points between said boundary points using the color data and coordinate data of the boundary points;

means for forming picture data representative of said three-dimensional picture from the produced data from said processor and from other data; and a second memory having first and second storage areas for storing the picture data in said first storage area and for storing the other data in said second storage area apart from the first storage area.

6. The apparatus of claim 5, further comprising means for mapping texture data to color data of said intermediate points and modifying said color data with the use of the mapped texture data.

7. The apparatus of claim 6, wherein the first memory is operative to store texture coordinates indicating coordinate positions of said two-dimensional data.

8. The apparatus of claim 5, wherein the raster processor is operative to select said boundary points as locations at the ends of a line segment extending along a horizontal direction of said predetermined screen and extending through said polygonal area at a predetermined distance from one of the apex points thereof and to produce color data of selected ones of said intermediate points positioned along said line segment by interpolation of color data of the selected boundary points.

9. A household game playing apparatus in which an object image for display as a three-dimensional picture is formulated, comprising:

an external storage medium in which a game program and picture information employed in executing said game program are stored;

display means for displaying picture data;

a first memory for storing first coordinate data of apex points of a plurality of polygonal areas as units of the object image included in said picture data;

a processor for converting the first coordinate data of the apex points of the polygonal areas stored in said first memory responsive to an input from said operating means for producing second coordinate data thereof on a predetermined screen and for producing color data for each of the apex points, for producing color data and coordinate data of boundary points between said apex points using the color data and coordinate data on said screen of said apex points, and for producing color data and coordinate data of intermediate points between said boundary points using the color data and coordinate data of said boundary points;

operating means for processing the picture information of the game program stored in said external storage medium in accordance with the produced data from said processor and other data so as to form the display picture data representing movement of the object image;

a second memory having first and second storage areas for storing the display picture data in said first storage area and for storing the other data in said second storage area other than said first storage area.

10. The household game playing apparatus of claim 9, wherein said external storage medium comprises a CD-ROM.

11. The household game playing apparatus of claim 9, wherein said external storage medium comprises a memory card.

12. The household game playing apparatus of claim 9, further comprising non-volatile storage means for storing a state of progress of the game upon termination of said game program.

13. A method for formulating image signals for producing a three-dimensional picture display comprising the steps of:

reading out first coordinate data for apex points of a plurality of polygonal picture areas as units of a desired three-dimensional picture stored in a first memory;

producing second coordinate data representing coordinates of the apex points on a predetermined screen based on the first coordinate data;

producing color data for each of said apex points;

producing color data and coordinate data of boundary points between the apex points using the color data and the coordinate data of each of said apex points on the predetermined screen;

producing color data and coordinate data of intermediate points between said boundary points using the color data and the coordinate data of said boundary points;

obtaining texture data for one or more of the apex points, the boundary points, and the intermediate points;

forming image signals for producing a three-dimensional picture from the produced data and from the texture data;

storing said image signals in a first storage area of a second memory; and storing the texture data in a second storage area of said second memory other than the first storage area thereof.

14. An apparatus for formulating image signals representing a three-dimensional picture for displaying said three-dimensional picture with the use of said image signals, comprising:

a first memory for storing first coordinate data of apex points of a plurality of polygonal areas as units of a desired three-dimensional picture;

a processor for converting the first coordinate data of the apex points of the polygonal areas stored in said first memory to second coordinate data on a predetermined screen and for producing color data for each of said apex points, for producing color data and coordinate data of boundary points between said apex points based on the color data and the second coordinate data on the predetermined screen of the apex points, and for producing color data and coordinate data of intermediate points between said boundary points using the color data and coordinate data of the boundary points;

means for obtaining texture data for one or more of the apex points, the boundary points, and the intermediate points;

means for forming picture data representative of said three-dimensional picture from the produced data from said processor and from the texture data; and a second memory having first and second storage areas for storing the picture data in said first storage area and for storing the texture data in said second storage area apart from the first storage area.

* * * * *